US012404716B2

(12) United States Patent
Hawkinson

(10) Patent No.: US 12,404,716 B2
(45) Date of Patent: Sep. 2, 2025

(54) INTEGRATED GUIDE SYSTEM AND DOOR SEAL FOR A SOFT CLOSE SLIDING DOOR

(71) Applicant: ASSA ABLOY Accessories and Door Controls Group, Inc., Monroe, NC (US)

(72) Inventor: William Hawkinson, Germantown, TN (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 1216 days.

(21) Appl. No.: 17/034,689

(22) Filed: Sep. 28, 2020

(65) Prior Publication Data

US 2021/0010324 A1 Jan. 14, 2021

Related U.S. Application Data

(63) Continuation-in-part of application No. 16/104,535, filed on Aug. 17, 2018, now Pat. No. 11,118,385.

(60) Provisional application No. 62/654,662, filed on Apr. 9, 2018.

(51) Int. Cl.
*E06B 7/23* (2006.01)
*E05D 15/06* (2006.01)
*E06B 7/215* (2006.01)

(52) U.S. Cl.
CPC .......... *E06B 7/2312* (2013.01); *E05D 15/063* (2013.01); *E05Y 2201/64* (2013.01); *E05Y 2900/132* (2013.01); *E06B 7/215* (2013.01)

(58) Field of Classification Search
CPC .................................................... E06B 7/2312
See application file for complete search history.

(56) References Cited

U.S. PATENT DOCUMENTS 3,229,332 A * 1/1966 Koller ........................ E06B 3/34 49/490.1
3,857,199 A 12/1974 Frach et al.
4,112,623 A * 9/1978 McPherson ........... E06B 7/2312 49/495.1

(Continued)

FOREIGN PATENT DOCUMENTS

CA 3077427 A1 8/2019
DE 2462185 A1 4/1976

OTHER PUBLICATIONS

ASSA ABLOY Accessories and Door Controls Group, Inc., Canadian Patent Application No. 3,144,370, Office Action, Oct. 19, 2023.

(Continued)

*Primary Examiner* — Catherine A Kelly
(74) *Attorney, Agent, or Firm* — Moore & Van Allen PLLC; Jeffrey R. Gray

(57) ABSTRACT

A door system includes a door having a top edge, a leading edge, a trailing edge and an inner face. A first gasket is deformed into engagement with the inner face adjacent the top edge, a second gasket is deformed into engagement with the inner face adjacent the top edge and spaced from the first gasket. An acoustic barrier is positioned to close a gap between the first gasket, the second gasket and the inner face. A third gasket is mounted to a structure adjacent the door and a fourth gasket is mounted to the trailing edge of the door. Sealing members on the first gasket engage sealing members on the second gasket when the door is in the closed position.

13 Claims, 23 Drawing Sheets

(56) References Cited

U.S. PATENT DOCUMENTS

| | | | | |
|---|---|---|---|---|
| 4,157,634 | A | 6/1979 | Coulston | |
| 4,192,100 | A | 3/1980 | Klema | |
| 4,344,257 | A | 8/1982 | Anderson | |
| 4,356,856 | A | 11/1982 | Bengtsson | |
| 4,483,099 | A | 11/1984 | Schmidt | |
| 4,538,380 | A | 9/1985 | Colliander | |
| 4,604,831 | A * | 8/1986 | Tunnicliffe | E06B 3/44 49/404 |
| 4,660,338 | A | 4/1987 | Wagner | |
| 4,790,108 | A * | 12/1988 | Giguere | E06B 7/2312 D25/119 |
| 5,356,694 | A | 10/1994 | Knapp | |
| 5,566,505 | A | 10/1996 | Kamezaki | |
| 5,983,570 | A | 11/1999 | Brown | |
| 6,082,432 | A | 7/2000 | Kissinger | |
| 6,088,966 | A | 7/2000 | Kenkel | |
| 6,125,584 | A | 10/2000 | Sanders | |
| 6,314,683 | B1 | 11/2001 | Vesa et al. | |
| 6,371,188 | B1 | 4/2002 | Baczuk et al. | |
| 6,502,832 | B2 * | 1/2003 | Goto | B60J 10/50 277/642 |
| 6,606,831 | B2 | 8/2003 | Degelsegger | |
| 6,973,753 | B2 | 12/2005 | Liebscher | |
| 7,171,785 | B1 * | 2/2007 | Kelly | B60J 10/235 49/377 |
| 7,174,675 | B2 | 2/2007 | Araneva et al. | |
| 7,866,003 | B2 | 1/2011 | Tooyama | |
| 7,958,674 | B2 | 6/2011 | Meister | |
| 8,112,954 | B2 | 2/2012 | Gosling et al. | |
| 8,209,909 | B2 * | 7/2012 | Rissone | F16J 15/025 49/495.1 |
| 8,256,166 | B2 * | 9/2012 | Lonnberg | E06B 7/2312 52/68 |
| 8,272,167 | B2 | 9/2012 | Sato | |
| 8,307,497 | B2 | 11/2012 | Chang et al. | |
| 8,839,563 | B2 | 9/2014 | Kalempa et al. | |
| 8,881,464 | B1 | 11/2014 | Huckeba | |
| 8,915,020 | B2 | 12/2014 | Sauter | |
| 8,955,271 | B2 * | 2/2015 | Keller | E05D 15/0621 52/207 |
| 9,745,798 | B2 | 8/2017 | Preising, Jr. et al. | |
| 9,855,829 | B2 * | 1/2018 | Yamada | B60J 1/08 |
| 9,863,178 | B2 | 1/2018 | Wang et al. | |
| 9,869,115 | B2 | 1/2018 | Nilsson | |
| 9,885,206 | B2 | 2/2018 | Shin | |
| 10,035,411 | B2 * | 7/2018 | Toyota | B60J 10/50 |
| 10,077,593 | B2 * | 9/2018 | Meeks | E06B 1/70 |
| 10,113,356 | B2 | 10/2018 | Lenox et al. | |
| 10,196,854 | B2 | 2/2019 | Kross | |
| 10,239,399 | B2 * | 3/2019 | Masumoto | E06B 7/2312 |
| 10,450,796 | B2 * | 10/2019 | Seuberling | E05D 15/0643 |
| 10,455,989 | B2 | 10/2019 | Wei | |
| 10,526,839 | B2 * | 1/2020 | Kling | E06B 3/96 |
| 10,563,453 | B2 * | 2/2020 | Steinke | E06B 7/2312 |
| 10,781,629 | B2 | 9/2020 | Haab et al. | |
| 11,180,948 | B2 | 11/2021 | Hrlendsberger et al. | |
| 11,280,130 | B2 * | 3/2022 | Goldfinch | E06B 7/215 |
| 11,326,393 | B2 * | 5/2022 | Gosling | E05B 65/0811 |
| 12,006,764 | B2 | 6/2024 | Benotto | |
| 2005/0066581 | A1 | 3/2005 | Rhode et al. | |
| 2010/0242365 | A1 | 9/2010 | Langner et al. | |
| 2012/0260579 | A1 | 10/2012 | Demello | |
| 2013/0167444 | A1 | 7/2013 | Rydn et al. | |
| 2016/0369547 | A1 | 12/2016 | Sato | |
| 2017/0253256 | A1 | 9/2017 | Krueger | |
| 2018/0283089 | A1 | 10/2018 | Mertinooke et al. | |
| 2019/0119967 | A1 | 4/2019 | Torrabias Cantal | |
| 2019/0309570 | A1 | 10/2019 | Hrlendsberger et al. | |
| 2019/0368266 | A1 | 12/2019 | Goldfinch et al. | |
| 2021/0010309 | A1 | 1/2021 | Montecchio et al. | |
| 2023/0151680 | A1 | 5/2023 | Praeg et al. | |

OTHER PUBLICATIONS

ASSA ABLOY Accessories and Door Controls Group, Inc., Canadian Patent Application No. 3,144,370, Office Action, Aug. 23, 2024.

* cited by examiner

INTEGRATED GUIDE SYSTEM AND DOOR SEAL FOR A SOFT CLOSE SLIDING DOOR

This application is a continuation-in-part of U.S. application Ser. No. 16/104,535, filed on Aug. 17, 2018, which claims benefit of priority under 35 U.S.C. § 119(e) to the filing date of U.S. Provisional Application No. 62/654,662, as filed on Apr. 9, 2018, both of which are incorporated by reference herein in their entirety.

FIELD

This invention relates generally to sliding doors and more particularly to soft close sliding doors and sliding doors having a sealing assembly.

BACKGROUND

A sliding door may be mounted on a track that allows the door to slide laterally relative to a door opening between an open position and a closed position. In the open position the door is spaced from the opening to allow ingress and egress through the door opening and in the closed position the door covers the opening to prevent ingress and egress through the door opening. A typical sliding door may be freely movable along the track such that the door is manually slid laterally between the open and closed positions. In certain circumstances the sliding door can approach the open and closed positions with an undesirable amount of force because the door is freely movable and the force applied to the door is variable. As a result, soft close systems have been developed that control the movement of the door as it reaches the fully open and/or fully closed positions. In some situations, it is desirable to provide a door having a seal such that when the door is in the closed position the door is sealed to prevent or substantially reduce the transmission of air, sound, debris and the like across the door opening. In some embodiments the sealing system includes a bottom seal that engages the floor when the door is in the closed position.

SUMMARY

In some embodiments, a sliding door system comprises a door comprising a top edge, a leading edge and a trailing edge defining an inner face. The door is mounted for sliding movement relative to a door opening formed in a structure between a closed positon and an open position. A first gasket and a second gasket are deformed into engagement with the inner face adjacent the top edge. The first gasket is spaced from the second gasket to create a gap between the first gasket, the second gasket and the inner face. An acoustic barrier is positioned at one end of the first gasket and the second gasket. The acoustic barrier engages the inner face and closes the gap between the first gasket, the second gasket and the inner face when the door is in the closed position.

The acoustic barrier may comprise a front side that slidably engages the inner face of the door. The front side of the acoustic barrier may be generally planar and deformable. The front side of the acoustic barrier may comprise a pad that slidably engages the inner face of the door. The acoustic barrier may comprise a plate that is dimensioned to extend between the first gasket and the second gasket. The plate may support the pad. The pad may comprise a pile pad. A back side of the acoustic barrier may comprise slots that receive a mounting fascia for the first gasket and the second gasket. The acoustic barrier may be fixed to the structure. A third gasket may be mounted to the structure such that it is positioned adjacent the trailing edge of the door when the door is in the closed position and a fourth gasket may be mounted to the trailing edge of the door. The third gasket may comprise a plurality of first deformable sealing members and the fourth gasket may comprise a plurality of second deformable sealing members. The plurality of first deformable sealing members may interdigitate with the plurality of second deformable sealing members when the door is in the closed position. The plurality of first deformable sealing members may alternate with the plurality of second deformable sealing members in a direction from the leading edge of the door toward the trailing edge of the door when the door is in the closed position. The third gasket may be mounted to the structure such that the plurality of first deformable sealing members extend at a non-perpendicular angle relative to the door. A channel member may be disposed generally vertically to receive the leading edge of the door when the door is in the closed position where the channel member comprises a fifth gasket that faces the door such that when the door is in the closed position and the leading edge of the door is received in the channel, the fifth gasket engages the door near the leading edge.

In some embodiments, a sealing assembly for a door is provided where the door comprises a top edge, a leading edge and a trailing edge defining an inner face where the door is mounted for movement relative to a door opening formed in a structure between a closed positon and an open position. A first gasket and a second gasket are deformed into engagement with the inner face adjacent the top edge where the first gasket is spaced from the second gasket to create a gap between the first gasket, the second gasket and the inner face. An acoustic barrier is positioned at one end of the first gasket and the second gasket, where the acoustic barrier engages the inner face and closes the gap between the first gasket, the second gasket and the inner face when the door is in the closed position. A third gasket is mounted to the structure such that it is positioned adjacent the trailing edge of the door when the door is in the closed position and a fourth gasket is mounted to the trailing edge of the door. The third gasket comprises a plurality of first deformable sealing members and the fourth gasket comprises a plurality of second deformable sealing members arranged such that the plurality of first deformable sealing members engage the plurality of second deformable sealing members when the door is in the closed position.

In some embodiments, a sliding door system comprises a door having a top edge, a leading edge and a trailing edge defining an inner face, the door being mounted for sliding movement relative to a door opening formed in a structure between a closed positon and an open position. A first gasket is mounted to the structure such that it is positioned adjacent the trailing edge of the door when the door is in the closed position and a second gasket is mounted to the trailing edge of the door. One of the first gasket and the second gasket comprises a plurality of first deformable sealing members and the other one of the first gasket and the second gasket comprises at least one second deformable sealing member. The plurality of first deformable sealing members interdigitate with the at least one second deformable sealing member when the door is in the closed position.

The plurality of first deformable sealing members may alternate with the at least one second deformable sealing member in a direction from the leading edge of the door toward the trailing edge of the door when the door is in the closed position. The first gasket may be mounted to the structure such that the plurality of first deformable sealing members extend at a non-perpendicular angle relative to the door. A third gasket and a fourth gasket may be deformed into engagement with the inner face adjacent the top edge. The third gasket may be spaced from the fourth gasket to create a gap between the first gasket, the second gasket and the inner face. An acoustic barrier may be positioned at one end of the first gasket and the second gasket where the acoustic barrier engages the inner face and closes the gap between the first gasket, the second gasket and the inner face when the door is in the closed position. The acoustic barrier may comprise a front side that slidably engages the inner face of the door. The front side of the acoustic barrier may comprise a soft pad. The acoustic barrier may comprise a plate that supports the pad where the plate comprises slots that receive a mounting fascia for the third gasket and the fourth gasket.

DETAILED DESCRIPTION

Figure 1:
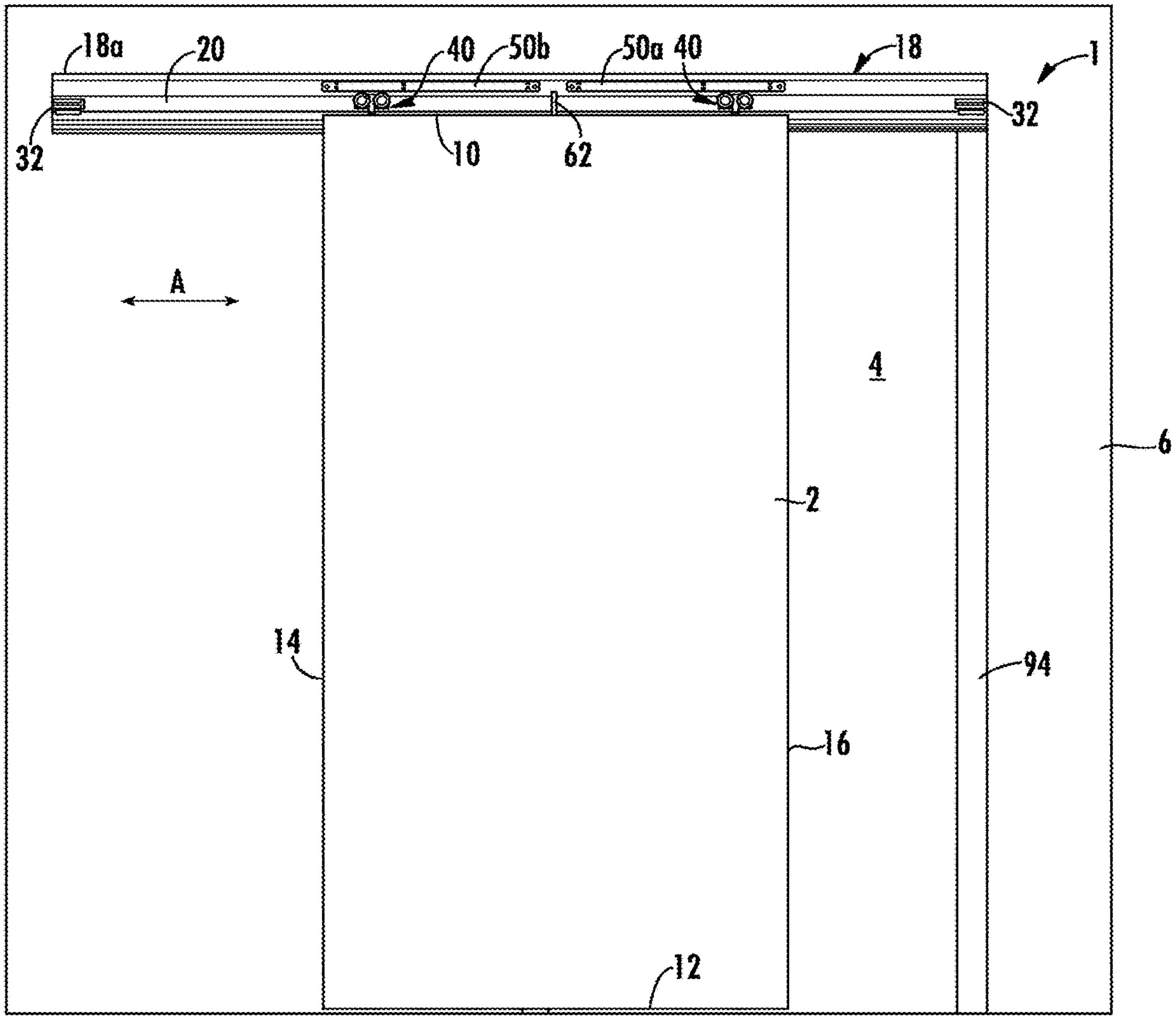
FIG. 1 is a plan view of an embodiment of a portion of a door assembly in a partially open position according to the present invention.
Figure 2:
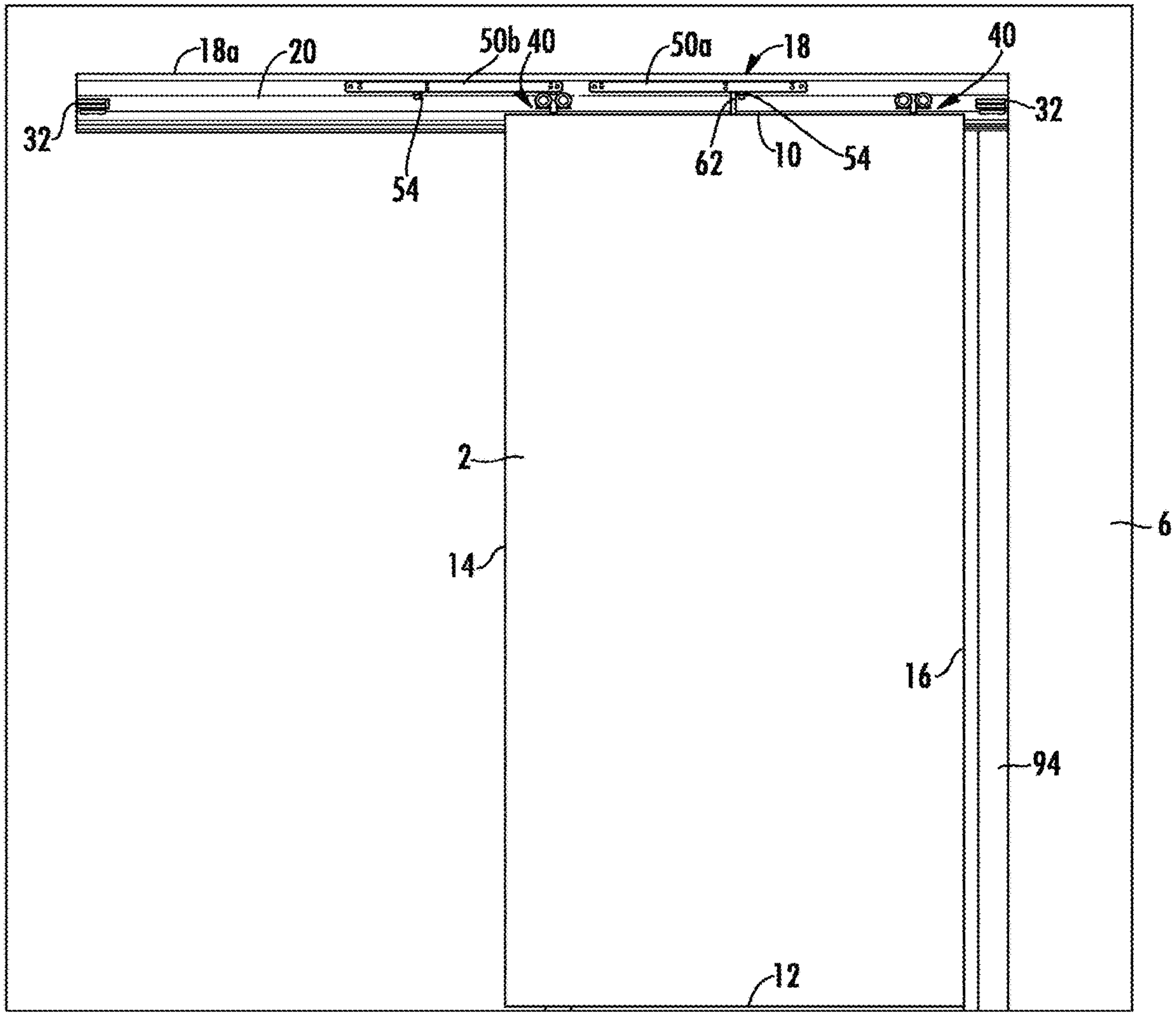
FIG. 2 is a plan view of the door assembly of FIG. 1 in a near closed position.

Embodiments of the present invention now will be described more fully hereinafter with reference to the accompanying drawings. Referring to the figures, an embodiment of a sliding door assembly is shown. While one embodiment of a door assembly is shown and described, the inventions described herein may be used in door assemblies other than the embodiment specifically shown and described herein.

The door assembly is shown generally at 1 and comprises a door 2 mounted for movement relative to a door opening 4 formed in a wall or other structure 6. The door opening 4 may provide ingress to or egress from a room, building, or other structure. The opening 4 may be selectively opened or closed by moving the door 2 laterally relative to the opening 4 between a fully open position and a fully closed position as represented by arrow A in FIG. 1. It will be appreciated that the door may assume partially open/closed positions between the fully open position and the fully closed position.

The door 2 may comprise a generally planar member defining a top edge 10, bottom edge 12, a first or trailing edge 14 and a second or leading edge 16. The door may be made of any suitable material and may be provided in a variety of suitable finishes and styles to meet both aesthetic needs and utilitarian requirements such as sound, smoke, fire proofing or the like. To support the door 2 for movement relative to the wall 6, an elongated mounting bracket 18 is mounted to the wall 6 over the opening 4. The mounting bracket 18 is mounted substantially horizontally and may extend for the full length of travel of the door 2. The mounting bracket 18 may be secured to the wall 6 by fasteners such as screws or the like. A track 20 is mounted to the mounting bracket 18 such that it extends for the full length of travel of the door 2. In one embodiment, the mounting bracket 18 has an overhang portion 18*a*. The track 20 is mounted substantially horizontally and extends over the opening 4 such that it supports the door 2 between the fully open position and the fully closed position. The mounting bracket 18 and track 20 may be made of a rigid, strong material such as, but not limited to, metal such as aluminum, steel, or the like, a plastic or polymer material or the like, or other suitable material, provided that the mounting bracket 18 and track 20 can support the door 2. The track 20 has a generally inverted U-shape cross section that includes downwardly extending support members 22 connected at their upper ends by a cross member 24. The cross member 24 may be secured to the overhang portion 18*a* of the support track 18 by fasteners 26 such as screws. The lower ends of the support members 22 terminate in inwardly extending support surfaces 28 that define a gap therebetween. Trollies 40 are supported on the support surfaces 28 and extend into the gap, as will herein after be described.

Figure 6:
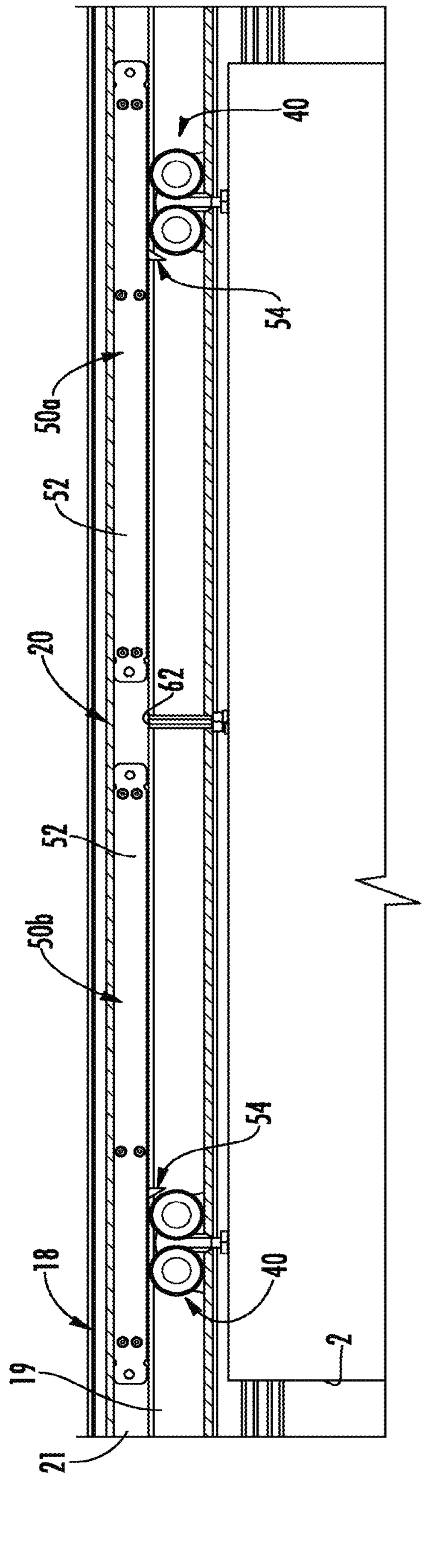
FIG. 6 is a detailed elevation view of the door assembly of FIG. 1 in a partially open position.
Figure 7:
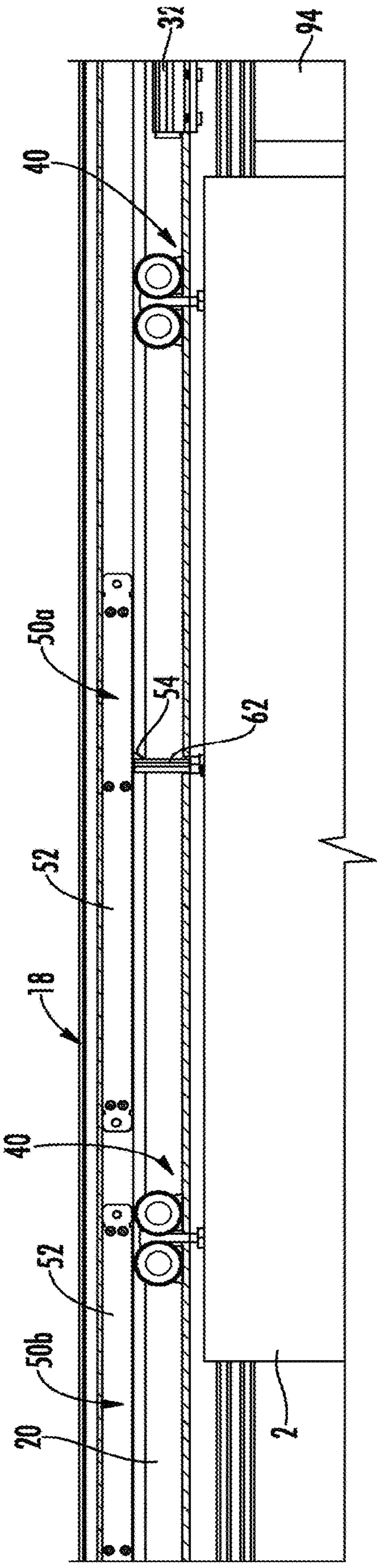
FIG. 7 is a detailed elevation view of the door assembly of FIG. 1 in a near closed position.

The support members 22 are formed to define a generally rectangular lower interior space 19 that communicates with the gap formed between the inwardly extending support surfaces 28 and a generally rectangular upper interior space 21 that communicates with the lower interior space, see FIGS. 1 and 6. The upper interior space 21 is dimensioned to retain the soft close devices 50*a*, 50*b* and the lower interior space is dimensioned to receive the trollies 40 and the stops 32 as will be hereinafter explained.

A front plate 30 may be secured to the mounting bracket and/or to the track to cover the support assembly and hide the internal components. The front plate 30 may be made of any suitable material and may be snap-fit to the mounting bracket 18 or it may be secured by separate fasteners. The front plate 30 may be provided in a variety of suitable finishes and styles to meet both aesthetic and utilitarian requirements.

Figure 10:
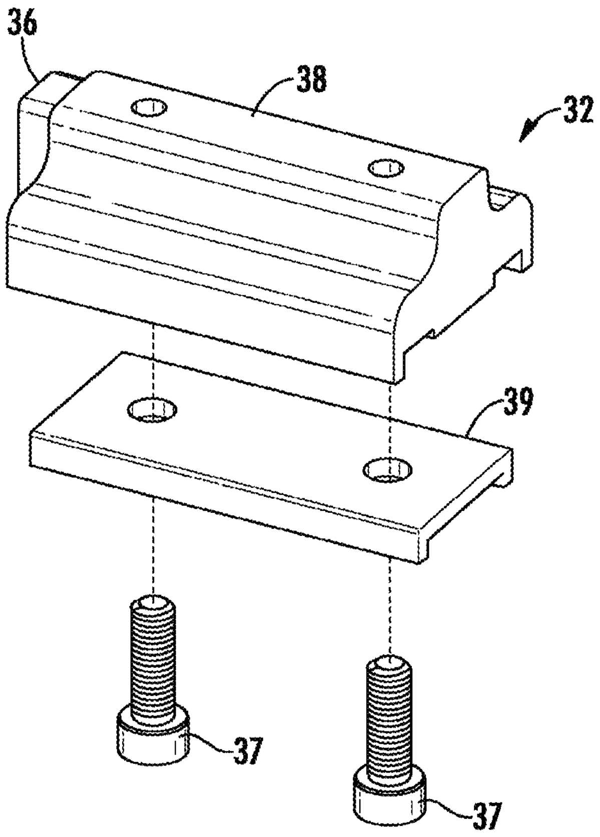
FIG. 10 is a detailed exploded perspective view of the stop of the door assembly of FIG. 1.
Figure 11:
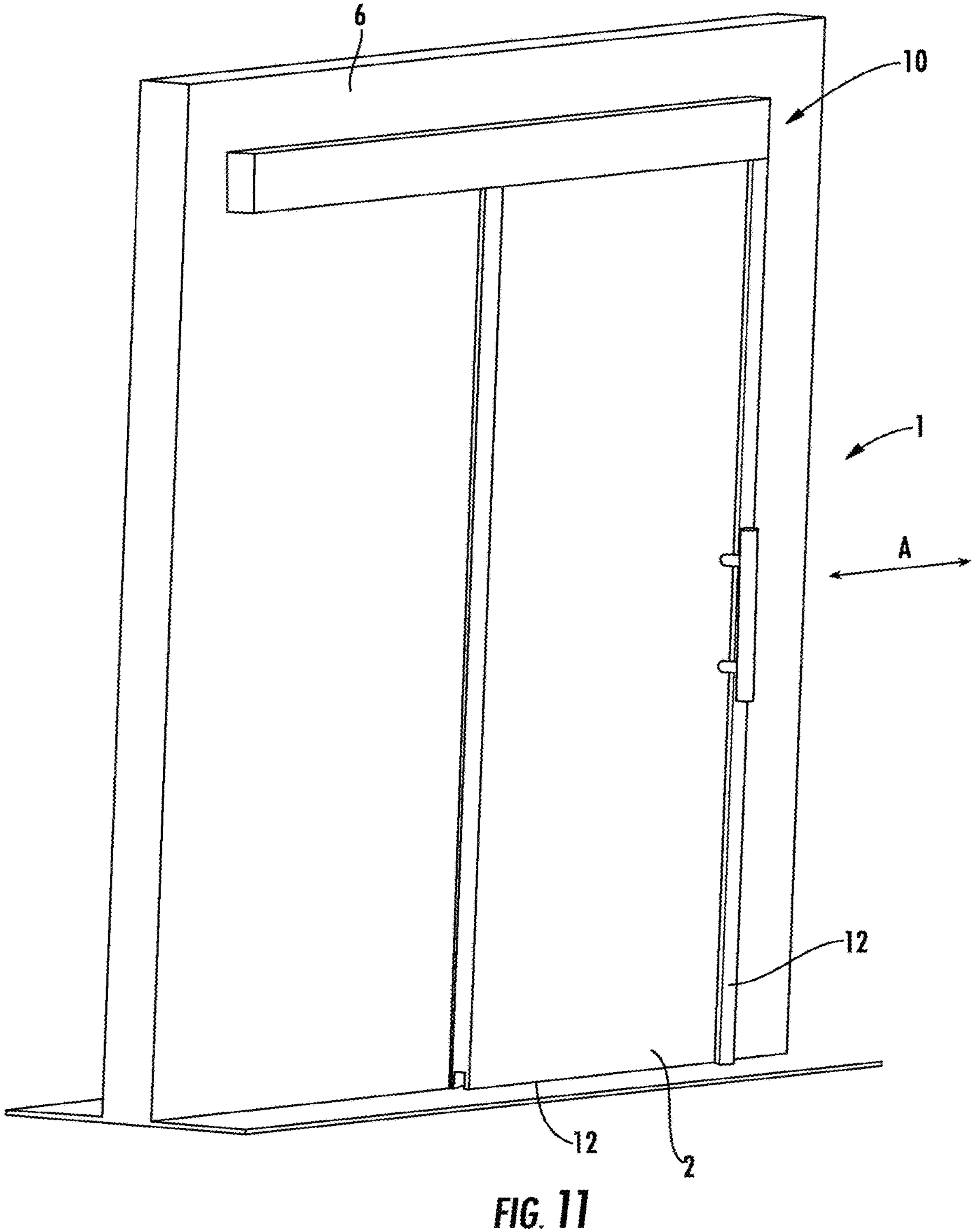
FIG. 11 is a perspective view of an embodiment of a door assembly in a closed position with an embodiment of the integrated guide assembly of the invention.
Figure 12:
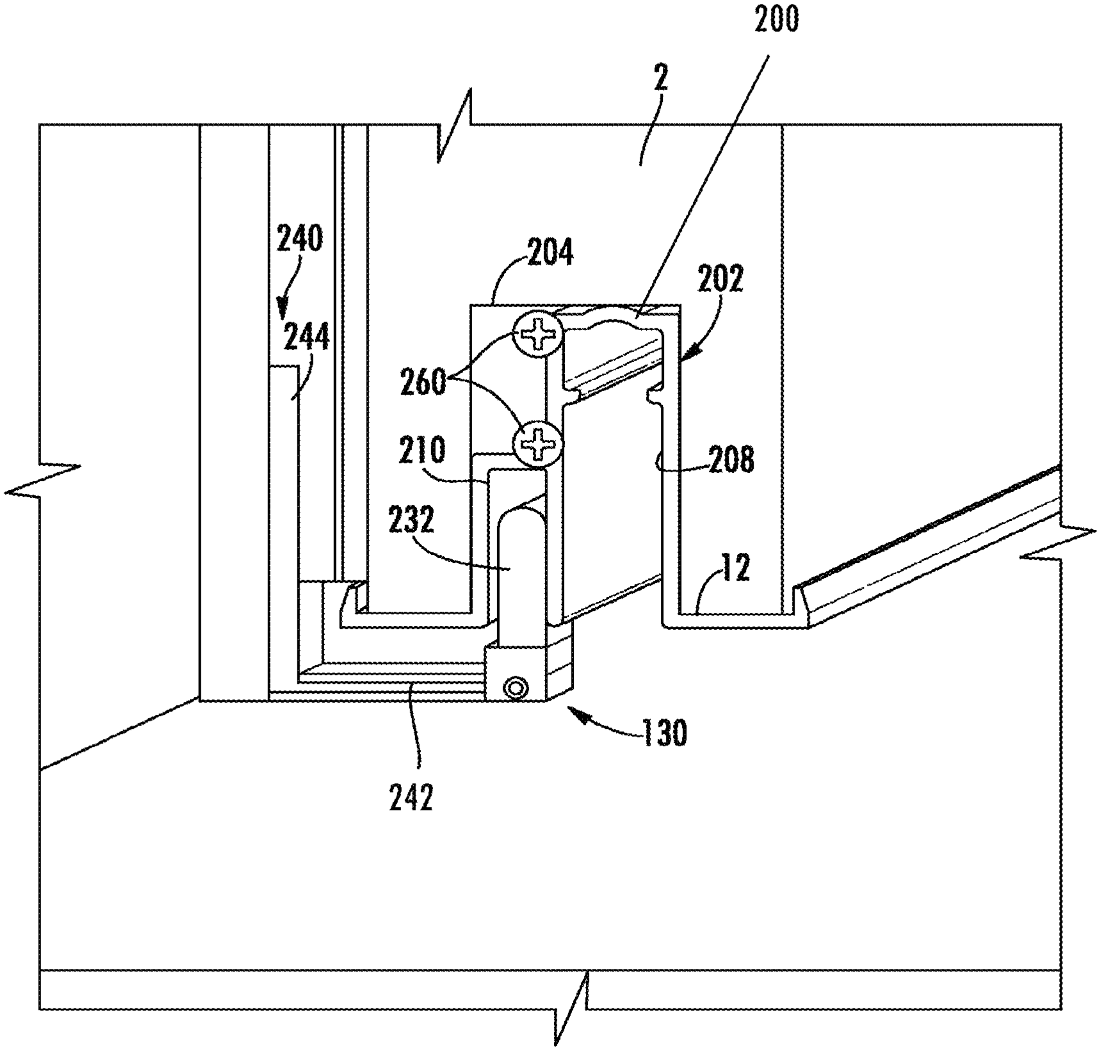
FIG. 12 is a detailed perspective view of the integrated guide assembly of FIG. 11.
Figure 13:
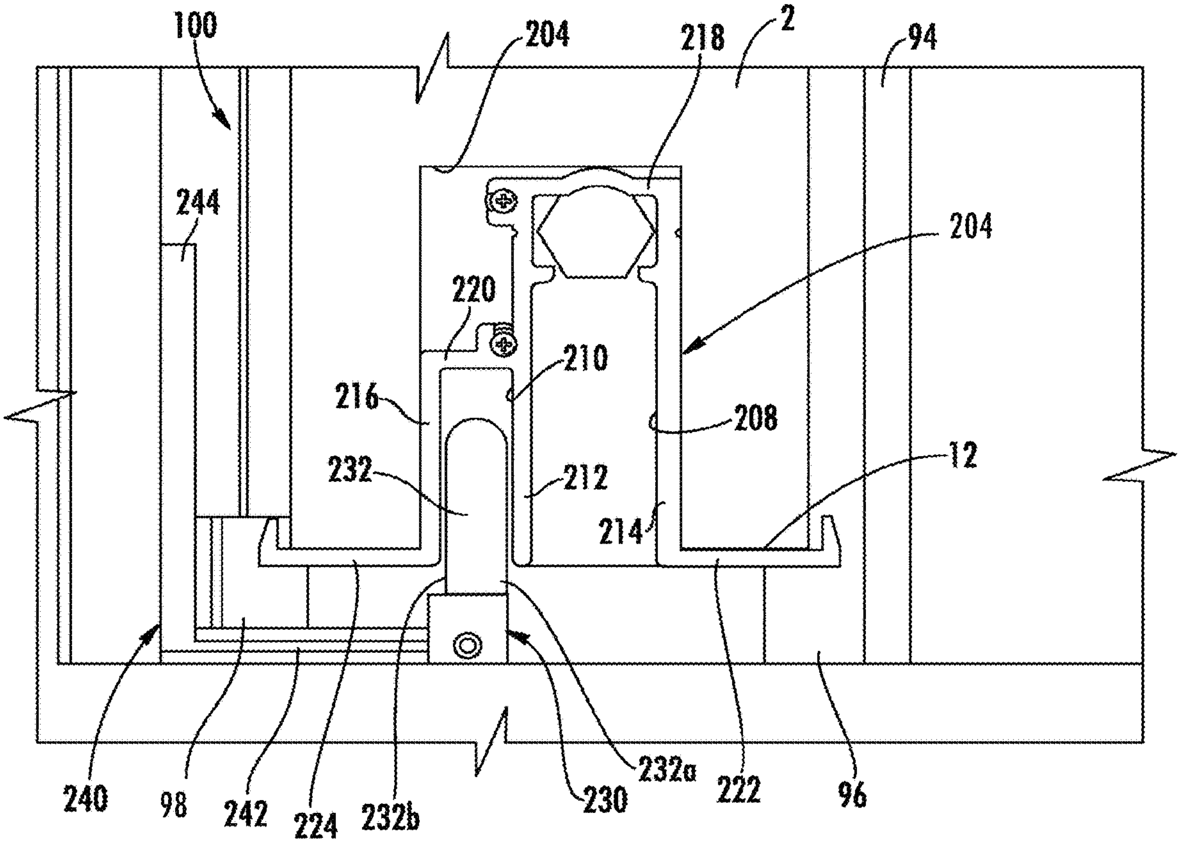
FIG. 13 is an end view of the integrated guide assembly of FIG. 11 with the bottom door seal removed.

A stop 32 may be secured to and supported at each end of the track 20 to close the track after the trollies 40 and soft close devices 50 are inserted into the track. Referring to FIG. 10 each stop 32 may comprise an elastomeric bumper or cushion 36 supported in a block 38 such that the bumper 36 extends from the block in a position where the trolley 40 may strike the bumper 36. Threaded members 37 threadably engage the block 38 and reverse threadably engage an opposing mounting bracket 39 such that rotation of the threaded members 37 forces the block 38 and plate 39 together. Block 38 is positioned in the lower interior space and plate 39 is positioned outside of and below the track 20 such that when the stops 32 are disposed in the track 20 and the block 38 and plate 39 are moved toward one another the support surfaces 28 of track 20 are clamped between the block 38 and plate 39. The stops 32 may be secured in the track by any suitable mechanism. An end plate 34 may be attached to each end of the mounting bracket 18 and front plate 30 such as by screws to complete the assembly. The end plates 34 may be provided in a variety of suitable finishes and styles to meet both aesthetic needs and utilitarian requirements such as sound, smoke, fire proofing or the like A frame 80 may be provided that defines or surrounds the opening 4. The frame 80 may be formed by individual frame members or caps 82, 84, 86 that fit over the opening 4 formed in wall 6 where the caps 82, 84, 86 may be secured to the wall by suitable fasteners. A greater or fewer number of frame members may be used. In other embodiments the frame 80 may be formed as part of the wall 6. The frame 80 may also comprise frame facias 88, 90, 92, 102 that connect to the caps using a snap-fit connection separate fasteners or the like.

Figure 18:
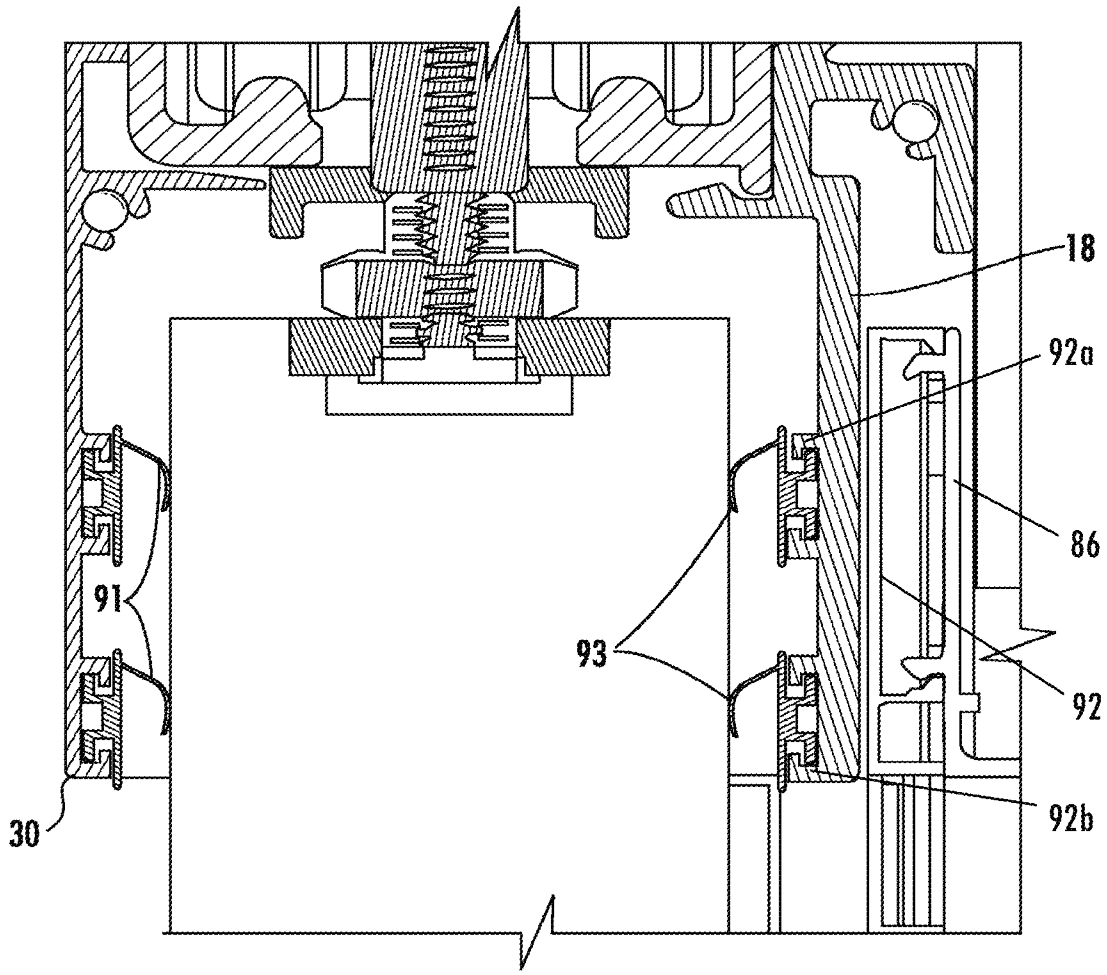
FIG. 18 is an end view of the top edge of the door.

In some embodiments, a seal between the door 2 and the wall 6 and door frame 4 is provided. The seal may create a barrier against sound, air, smoke, light, sightlines, debris or the like. Gaskets 91, 93, 96, 98, and 100 are provided to create the seal. The gaskets 91, 93, 96, 98 and 100 may be formed of any suitable compressible, resilient material such as rubber, polymer or the like. The gaskets 91, 93, 96, 98 and 100 create a seal around the periphery of the opening 4. In some embodiments each gasket 91, 93, 96, 98 and 100 may comprise at least one elongated sealing member that extends to the door to form a seal against the door. Referring to FIG. 18, gaskets 91 are supported in front plate 30 such that they extend along and engage the outer face of the door adjacent the top edge 10 of the door when the door is in the closed position. The gaskets 91 engage the front face of the door and are deformed into engagement with the front face to create the seal. The gaskets 91 may be supported in elongated slots or holders formed on the front plate 30 or by other securement mechanisms. Gaskets 93 are supported on mounting bracket 18 such that they extend along and engage the inner face of the door adjacent the top edge 10 of the door when the door is in the closed position. The gaskets 93 engage the inner face of the door and are deformed into engagement with the inner face to create the seal. The gaskets 93 may be supported in elongated slots or holders formed on the mounting bracket 18 or by other securement mechanisms.

Referring to FIGS. 20 through 26, in some embodiments, an acoustic barrier 300 may be provided to increase the sound proofing of the door. The embodiment of FIG. 20 uses the same reference numbers to describe the same elements previously described with reference to FIGS. 1-19. The acoustic barrier 300 prevents sound from penetrating the door through a gap 312 (FIG. 26) formed between the vertically spaced gaskets 93 and the inner face of the door 2 when the door is in a closed position.

The acoustic barrier 300 comprises a relatively flat plate 302 that is dimensioned to fit between the door 2 and the structure 6 and to extend across the gaskets 93. A front side 302*a* of plate 302 is planar and faces the door 2 of the plate. A pad 310 is attached to the front side 302*a* of the plate 302 such as by an adhesive layer 303. The pad 310 is deformable and may be resiliently deformable such that it may be pressed into engagement with the inner face of the door 2. The pad 310 may be formed of a relatively soft material such as a pile material.

Figure 26:
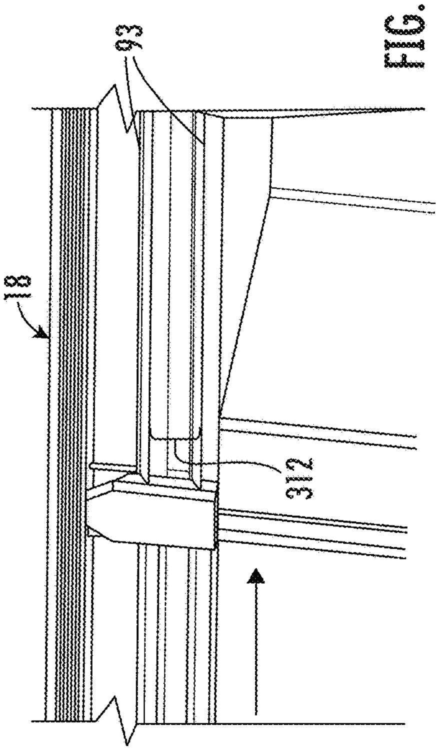
FIG. 26 is a perspective view showing the acoustic barrier of FIGS. 20 and 21 mounted on a door.

A back side 302*b* of the plate 302 is also generally planar and faces the support structure 6. Two pairs of grooves or slots 306 are formed in the back side 302*b* of the plate 302 and extend through the width of the plate from the leading edge to the trailing edge of plate 302. The grooves or slots 306 extend parallel to and are aligned with the gaskets 93. In a typical installation, the direction of travel of the door is generally horizontal such that the gaskets 93 and grooves or slots 306 extend substantially horizontally. The grooves or slots 306 are shaped and dimensioned to closely but slidably receive flanges 92*a*, 92*b* on the bracket 18 for the gaskets 93 such that the plate 302 may be slid onto the end of the bracket 18. In the illustrated embodiment, the grooves or slots 306 each define a pair of parallel substantially L-shaped recesses that are shaped and dimensioned to receive matingly shaped flanges 92*a*, 92*b* on the bracket 18. The back side 302*b* of plate 302, except for grooves or slots 306, is planar and is configured such that it engages the structure 6 between and immediately adjacent to the gaskets 93. In the illustrated embodiment, portion 314 of back side 302*b* engages bracket 18 in the area immediately above the gaskets 93. Portion 316 of back side 302*b* engages the bracket 18 in the area between the gaskets 93. Portion 318 of back side 302*b* engages bracket 18 in the area immediately above the gaskets 93. The plate 302 is fixed to the structure 6 such as by a screw 304 that engages aperture 309 on plate 302 or other fixing mechanism such that the acoustic barrier 300 is fixed in position as shown in FIG. 26. The acoustic barrier 300 is positioned just beyond the end of the gaskets 93 at the trailing edge 14 of the door 2. The plate 302 is configured such that the back side 302*b* of the plate, except for the area of grooves or slots 306, is planar and abuts the structure 6. The pad 310 contacts the back side of the door 2 such that door 2 slides over pad 310 as the door is opened and closed. The acoustic barrier 300 closes gaps that would otherwise be found at the end of gaskets 93 to further attenuate the passage of sound through the door opening.

Figure 19:
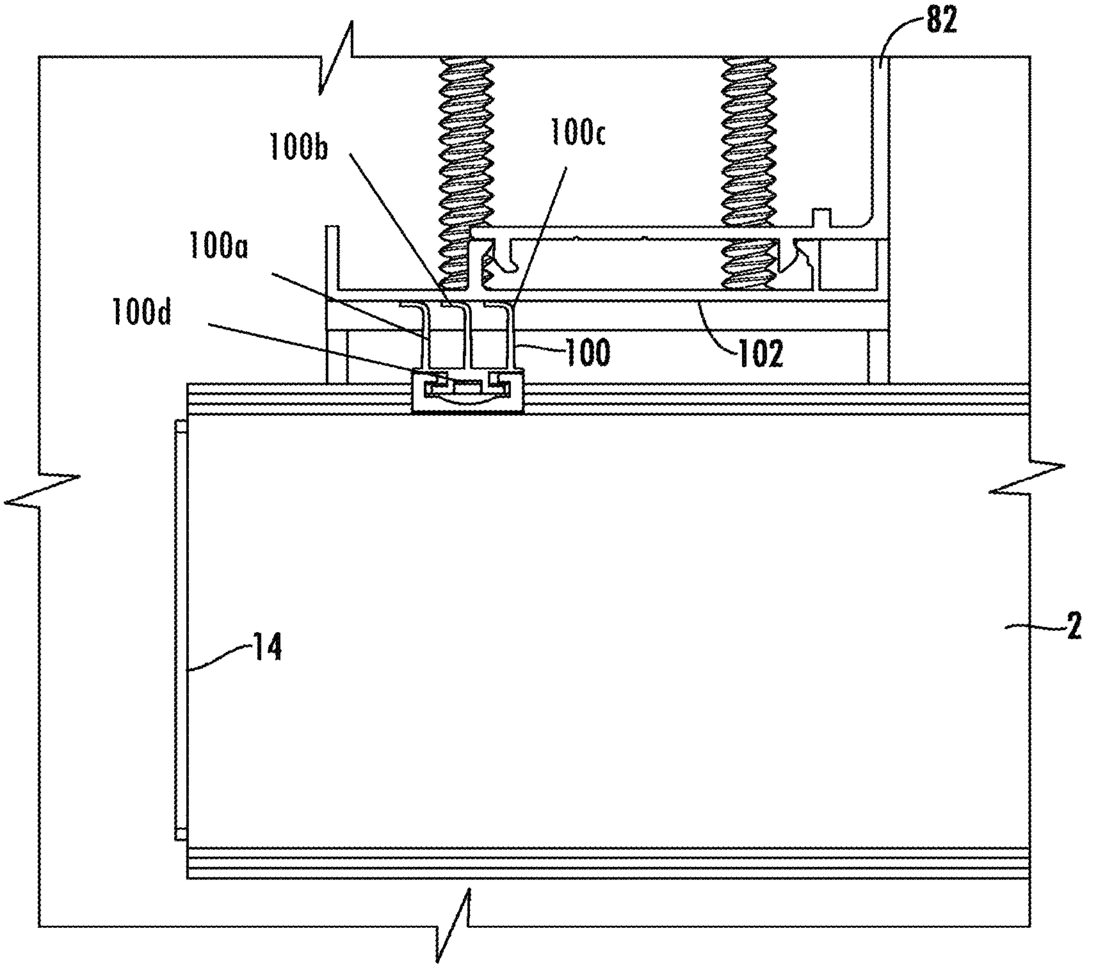
FIG. 19 is a top view of the trailing edge of the door in the closed position.

Referring to FIG. 19 gasket 100 is mounted to the back face of the door and extends for substantially the entire height of the door. The gasket 100 engages the facing surface of the wall 6 or fascia 102, as shown, and is deformed into engagement with the wall 6 or fascia 102 to create the seal along the trailing edge 14 of the door 2. The gasket 100 may be supported in elongated slots or holder 104 formed on or mounted to the door or by other securement mechanisms.

Figure 20:
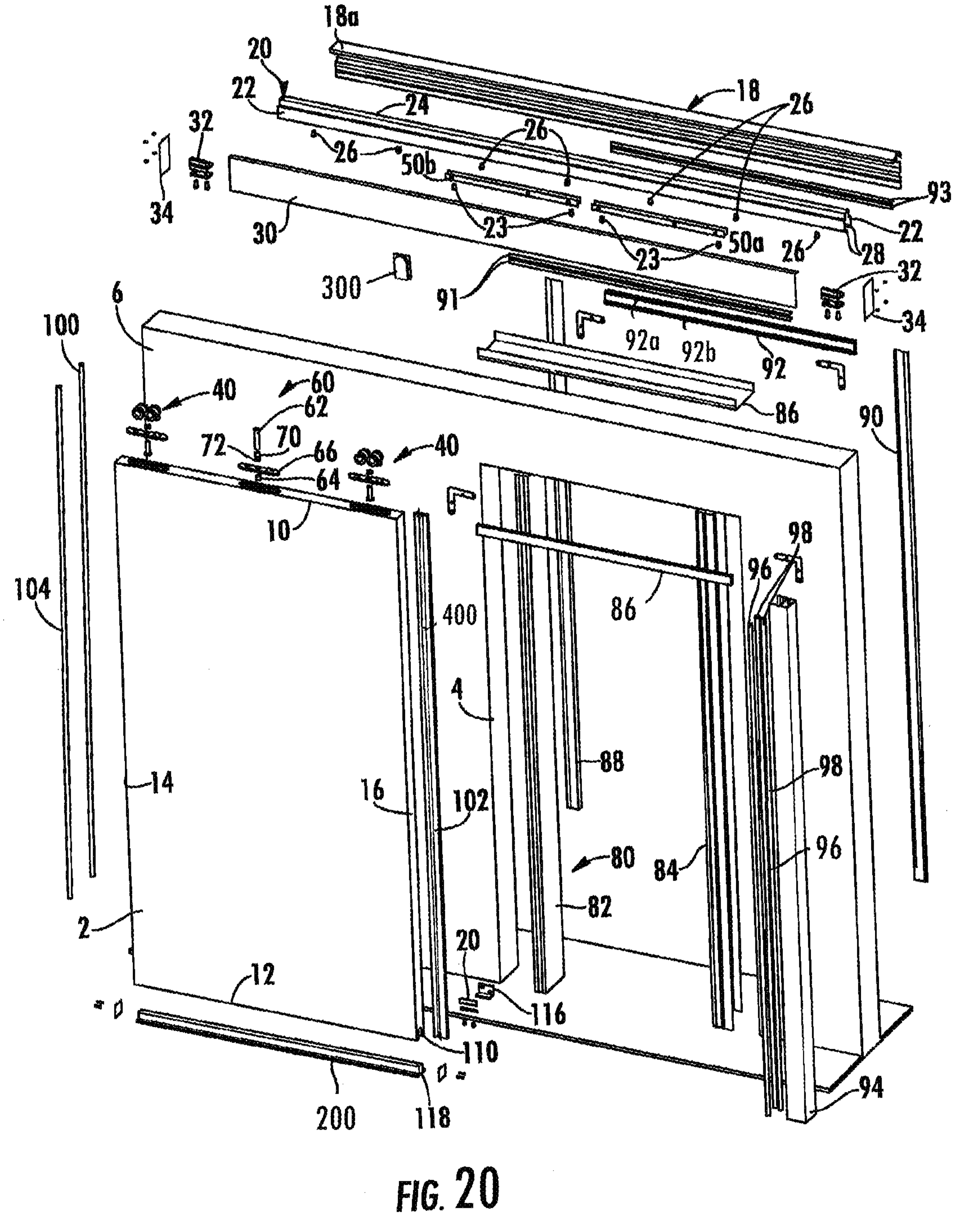
FIG. 20 is an exploded perspective view of another embodiment of the door assembly of FIG. 1 with additional acoustic barriers.
Figure 25:
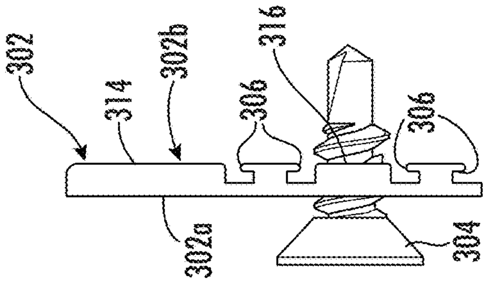
FIG. 25 is a side view of the support plate of FIG. 22.
Figure 24:
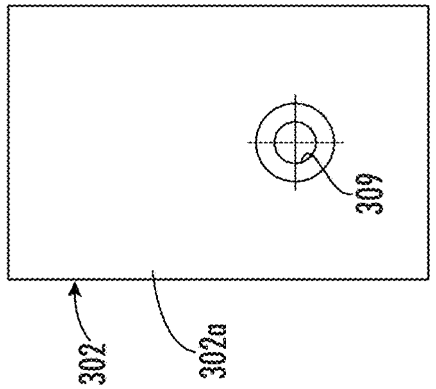
FIG. 24 is a front view of the support plate that forms part of the acoustic barrier of FIG. 21.
Figure 23:
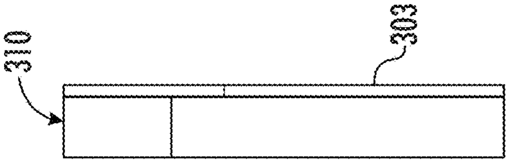
FIG. 23 is a side view of the acoustic pad of FIG. 22.
Figure 22:
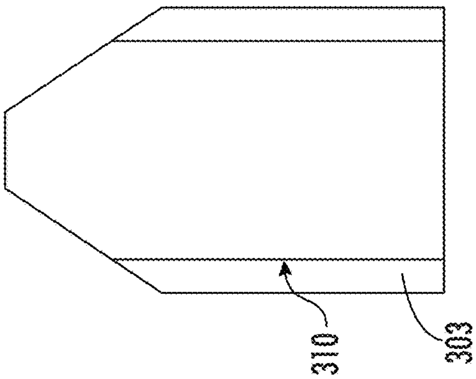
FIG. 22 is a front view of an acoustic pad that forms part of the acoustic barrier of FIG. 21.
Figure 21:
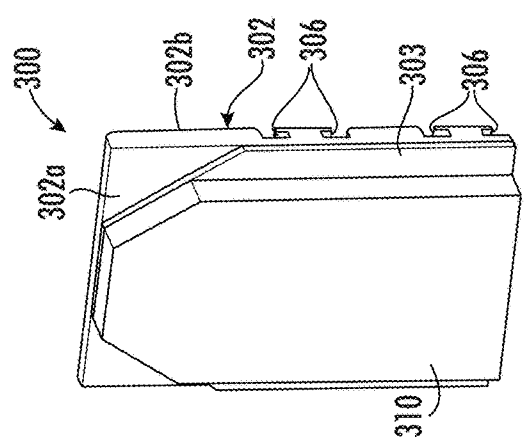
FIG. 21 is a perspective view of the acoustic barrier of FIG. 20.
Figure 27:
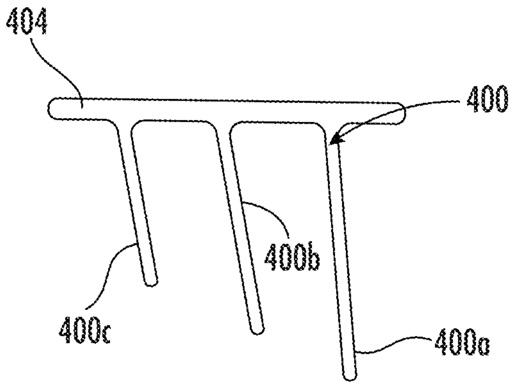
FIG. 27 is an end view of an additional sound attenuating gasket.
Figure 28:
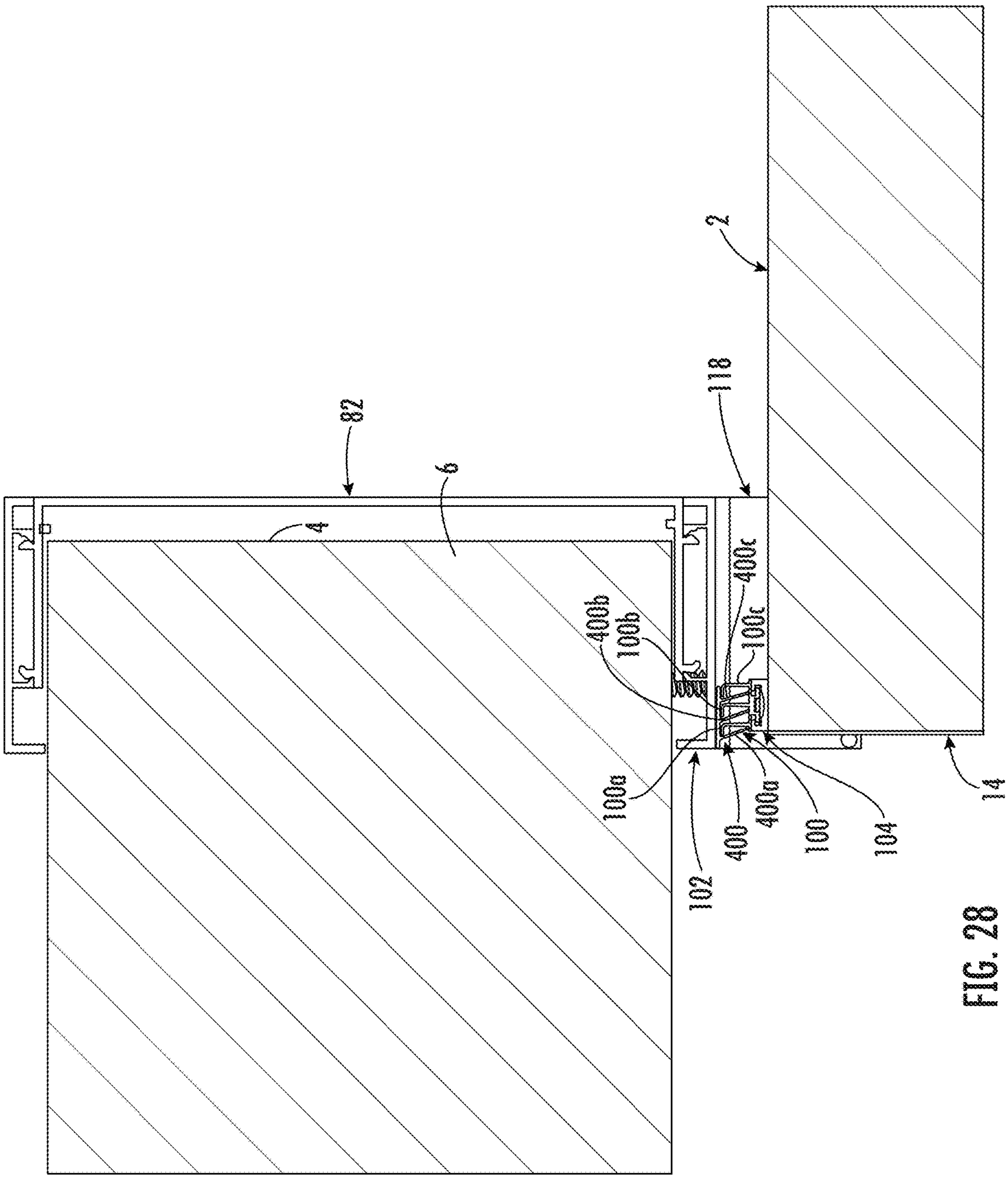
FIG. 28 is a horizontal section view showing the arrangement of the sound attenuating gasket of FIG. 27 mounted on the trailing edge of the door in the closed position.

Referring to FIGS. 20, 27 and 28, to further enhance the sound attenuation of the door, a mating second gasket 400 is mounted on the door frame 4. The mating second gasket 400 may be mounted to fascia 102, as shown in FIG. 20, and extends for substantially the entire height of the door 2. The mating second gasket 400 is located along the trailing edge 14 of the door 2 when the door is in the closed position. The gasket 400 is mounted in a fixed position on structure 6 such that the door 2 slides over the gasket 400 as the door 2 is opened and closed. In one embodiment, the gasket 400 is shown in end view in FIG. 27 and comprises three sealing members 400*a*, 400*b* and 400*c* that extend from a base member 404. The gasket 400 may be formed of any suitable compressible, resilient material such as rubber, polymer or the like. The three sealing members 400*a*, 400*b* and 400*c* extend at an angle relative to the base 404 such that when the base 404 is secured to the structure 6 the sealing members 400*a*, 400*b* and 400*c* angle or tilt in a direction toward the leading edge 16 of the door 2 and away from the trailing edge 14 of the door 2. The sealing members 400*a*, 400*b* and 400*c* also decrease in length from base 404 from the leading edge to the trailing edge.

The sealing members 400*a*, 400*b* and 400*c* are configured and spaced from one another such that when the door is in the closed position, the sealing members 400*a*, 400*b* and 400*c* interdigitate with the sealing members 100*a*, 100*b* and 100*c* of gasket 100. The sealing members 400*a*, 400*b* and 400*c* alternate with the sealing members 100*a*, 100*b* and 100*c* in a direction from the leading edge of the door toward the trailing edge of the door when the door is in the closed position. Specifically, sealing member 400*c* is positioned outside of sealing member 100*a*, sealing member 400*b* is positioned between sealing member 100*a* and 100*b* and sealing member 400*c* is positioned between sealing member 100*b* and 100*c*. As shown in FIG. 28, the sealing members 100*a*, 100*b*, 100*c* and the sealing members 400*a*, 400*b*, 400*c* are not shown in a deformed state as would be the case in actual use of the door where the sealing members 400*a*, 400*b*, 400*c* are compressed and deformed against the door 2 and the sealing members 100*a*, 100*b*, 100*c* are compressed and deformed against support structure 6. Because the gaskets 100 and 400 each have a base 100*d* and 404, respectively, from which the sealing members extend, at least some of the sealing members on each of the gaskets are compressed and deformed against the opposite base 100*d* and 404, respectively. The inter-engagement of sealing members 100*a*, 100*b*, 100*c* of gasket 100 and sealing members 400*a*, 400*b* and 400*c* of gasket 400 further attenuates the passage of sound. The inter-engagement of sealing members 100*a*, 100*b*, 100*c* of gasket 100 and sealing members 400*a*, 400*b* and 400*c* of gasket 400 and the acoustic barrier 300 cooperate to attenuate the passage of sound through the trailing edge 14 of the door 2.

The seal for the door 2 may further comprise a channel member 94 that is disposed generally vertically and faces the leading edge 16 of the door 2. The channel member 94 is dimensioned to receive the edge 16 of the door. The channel member 94 may comprise gaskets 96 and 98 that face both sides of the door such that when the door is in the closed position and the leading edge 16 of the door is received in the channel 94, gasket 96 engages the outer face of the door 2 near leading edge 16 and gaskets 98 engage the inner face of the door 2 near the leading edge 16 to create the seal. The gaskets 96 and 98 may be formed of any suitable compressible, resilient material such as rubber, polymer or the like. The gaskets 96 and 98 extend the height of the channel member 94 and door 2 to create a seal along the height of the door. In some embodiments each of the gaskets 96 and 98 may comprise at least one elongated sealing member that forms a seal against the door 2. The gaskets may be formed of any suitable compressible, resilient material such as rubber, polymer or the like. The gaskets 96 and 98 may be supported in elongated slots or holders formed on or mounted to the channel member 94 or by other securement mechanisms.

To seal the bottom of the door 2, the bottom edge 12 of the door 2 may include a bottom seal that is moved into engagement with the floor when the door is in the closed position as will hereinafter be described. The arrangement of the gaskets as described above and the bottom seal create a door seal that extends about the periphery of the door to prevent the movement of air, sound, light, smoke or the like from moving through the door opening when the door is closed.

Referring to FIGS. 1-9, the door 2 is supported by and suspended from the trollies 40 where one of the trollies 40 is mounted near the front edge 16 of the door and the other one of the trollies 40 is mounted near the rear edge 14 of the door. The trollies 40 are identical such that one of the trollies is described in detail. The trolley 40 comprises a carriage 42 that rotatably supports a plurality of wheels 44 that are disposed such that the wheels ride on the support surfaces 28 of track 20. The wheels 44 are arranged in pairs where in the illustrated embodiment, two pairs of wheels are provided. The trolley 40 is mounted on the door 2 using an apron assembly. The carriage 42 includes a threaded hole for receiving a threaded fastener 46 such as a screw such that the carriage 42 may be moved axially along the length of screw when the carriage 42 is rotated relative to the screw. A plate 48 is fixed to the top edge 10 of the door 4 trapping the head of screw between the door and the plate 48. The plate 48 may be positioned in a pocket 49 formed in the edge of the door 2 such that the plate 48 is flush with the top edge 10. The plate 48 may be fixed to the top edge 10 of the door 4 by suitable fasteners such as screws that are inserted through holes 47 and threaded into the door. A lock nut 45 may be provided to clamp the plate 48 between the head of the screw 46 and the nut 45 to fix the screw in position. The carriage 42 may be threaded along the length of the screw 46 to adjust the position of the carriage 42 and wheels 44 relative to the door to position the door 2 a set distance below the track and to adjust the position of the door 2 relative to the floor in order to account for variations in the construction of the door 2. The fastener 46 extends into the gap between the support surfaces 28 such that the wheels 44 are supported on to support surfaces 28.

An activator pin assembly 60 is mounted in the top edge 10 of the door 4 using a separate apron assembly from that used to mount the trollies 40 to the door. The activator pin assembly 60 comprises an activator pin 62 having a threaded end 62*a* that is threaded into a threaded sleeve 64. The threaded sleeve 64 is retained in a hole 66 formed in the top edge 10 of the door 4. A plate 66 may be fixed to the top edge of the door to retain the threaded sleeve 64 between the door and the plate and thereby fix the activator pin 62 to the door 2. The plate 66 may be positioned in a pocket 68 formed in the edge of the door 4 such that the plate 66 is flush with the surface of the top edge 10. The plate 66 may be fixed to the top edge of the door 2 by suitable fasteners such as screws that are inserted through holes 68 and threaded into the door. A lock nut 70 and lock washer 72 may be provided to fix the position of the activator pin 62. Rotation of the activator pin 62 relative to sleeve 64 and lock nut 70 increases or decreases the height of the activator pin 62 relative to the top edge of the door 2 such that the height of the pin 62 is adjustable.

Figure 3:
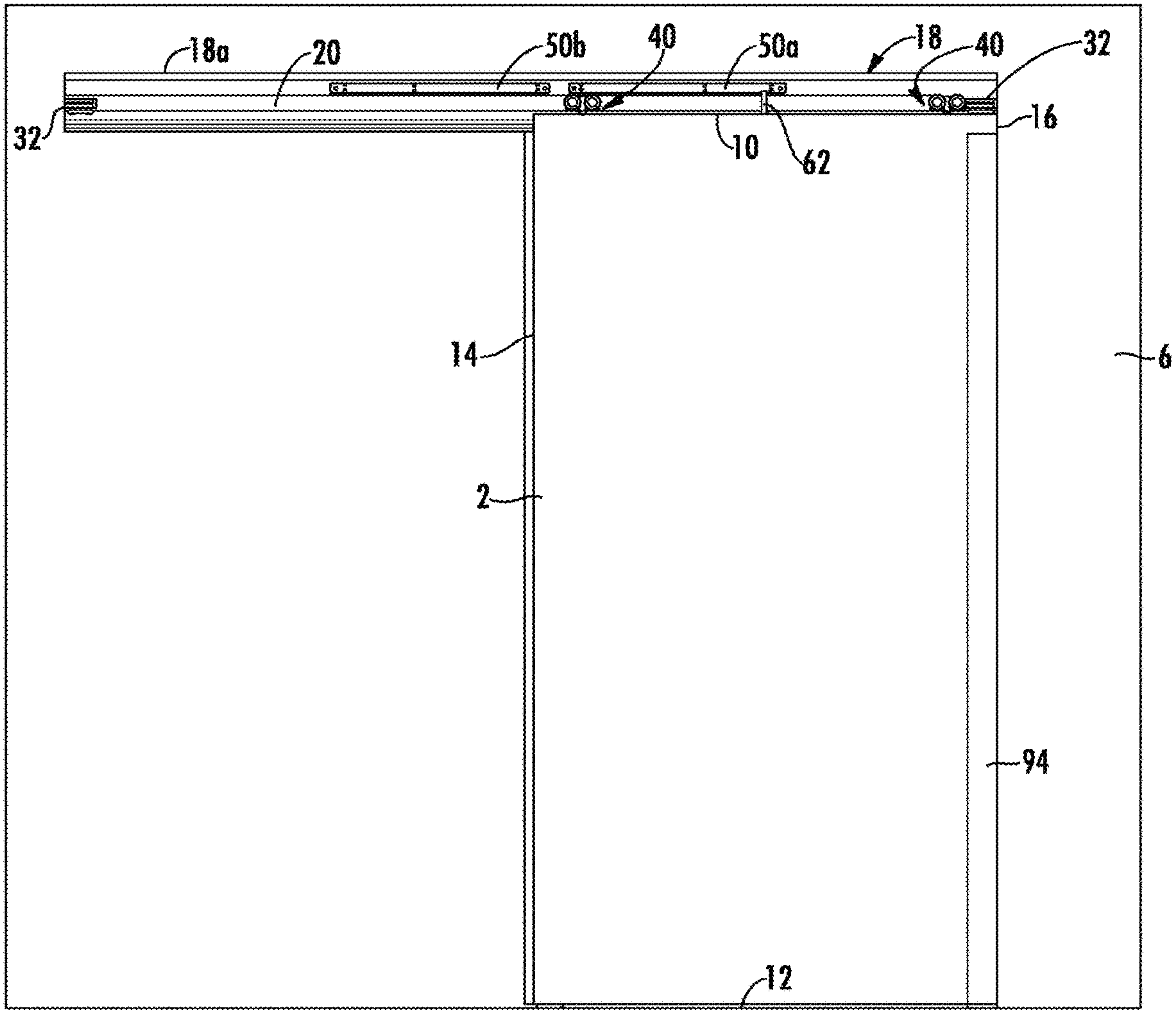
FIG. 3 is a plan view of the door assembly of FIG. 1 in a fully closed position.
Figure 4:
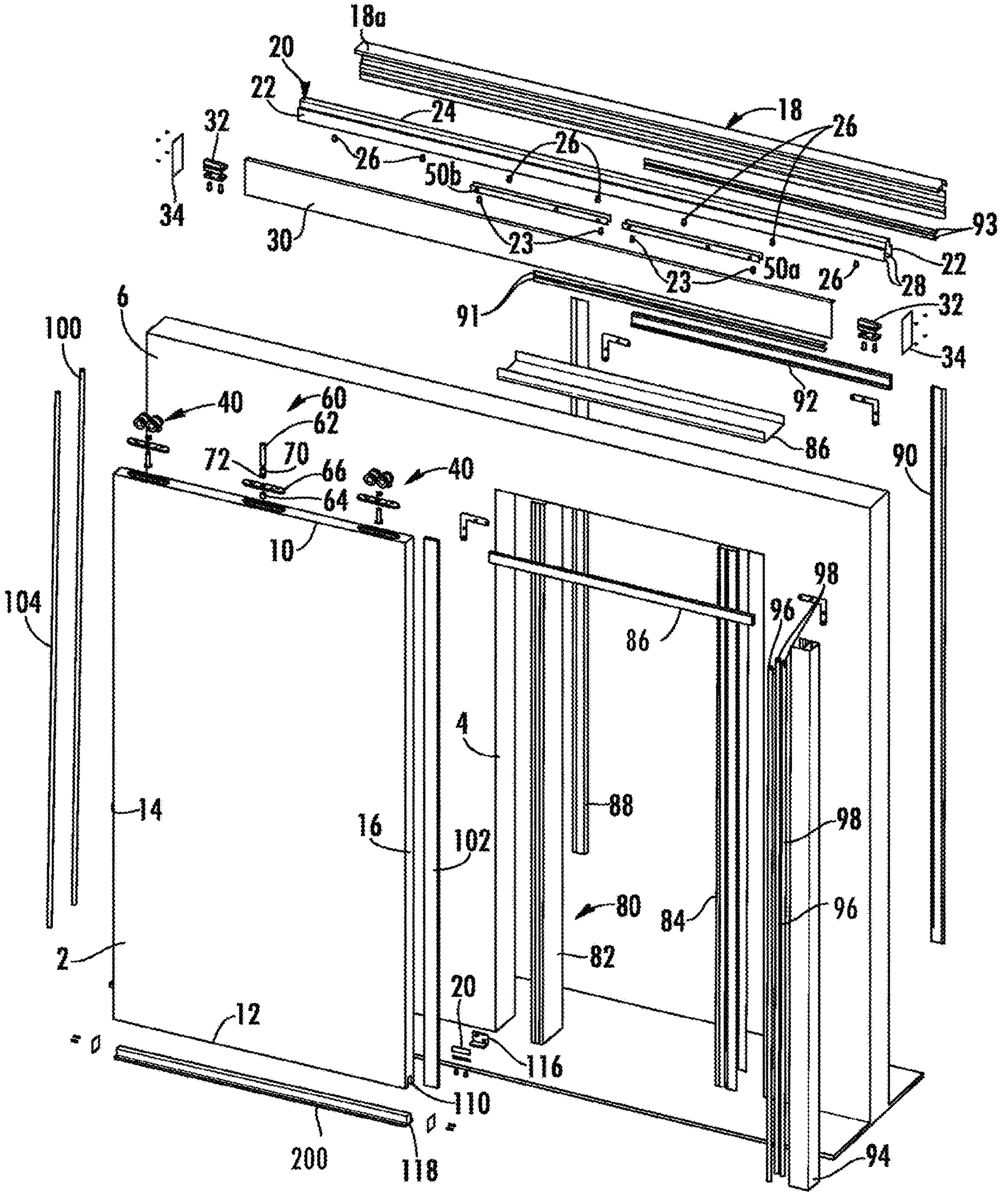
FIG. 4 is an exploded perspective view of the door assembly of FIG. 1.
Figure 5:
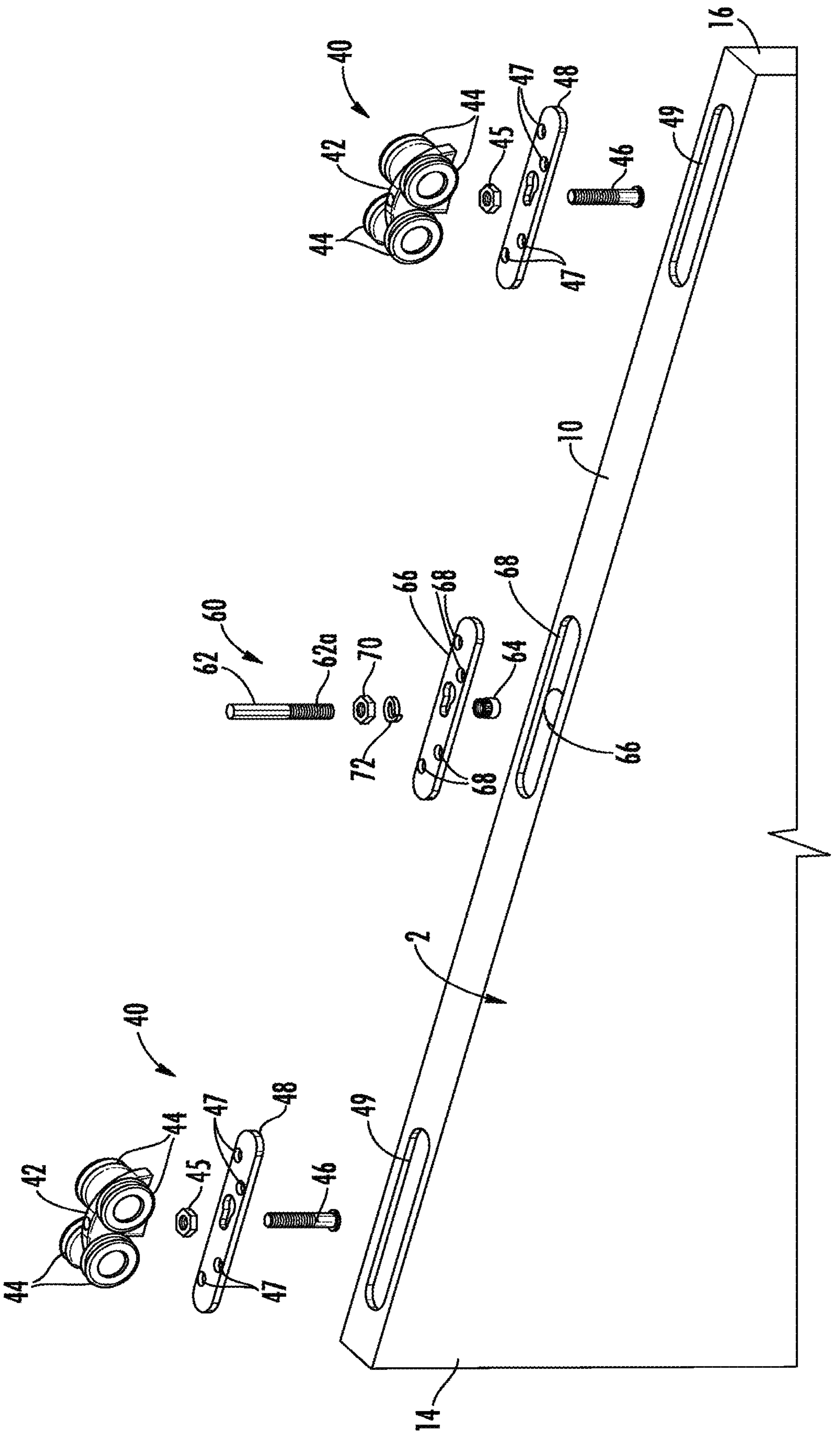
FIG. 5 is a detailed exploded perspective view of the door assembly of FIG. 1.

In one embodiment, the activator pin 62 is located in the center of the door 2 approximately midway between the leading edge 16 and the trailing edge 14 and may be positioned proximate to the vertical centerline of the door 2. The single activator pin 62 may be used to provide soft close functionality in both the opening direction and in the closing direction such that it is not necessary to provide two activators. While the activator pin 62 is described as being positioned approximately midway between the leading edge 16 and the trailing edge 14 it may be slightly offset from the center of the door 2 to allow the door to overlap with the opening as shown in FIG. 3.

Figure 8:
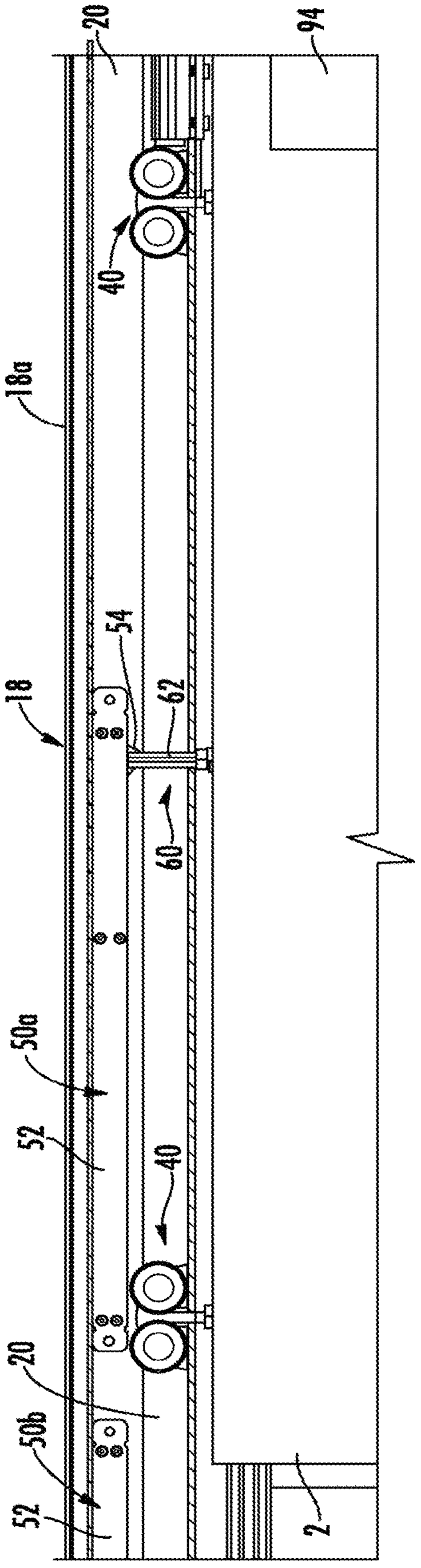
FIG. 8 is a detailed elevation view of the door assembly of FIG. 1 in a fully closed position.
Figure 9:
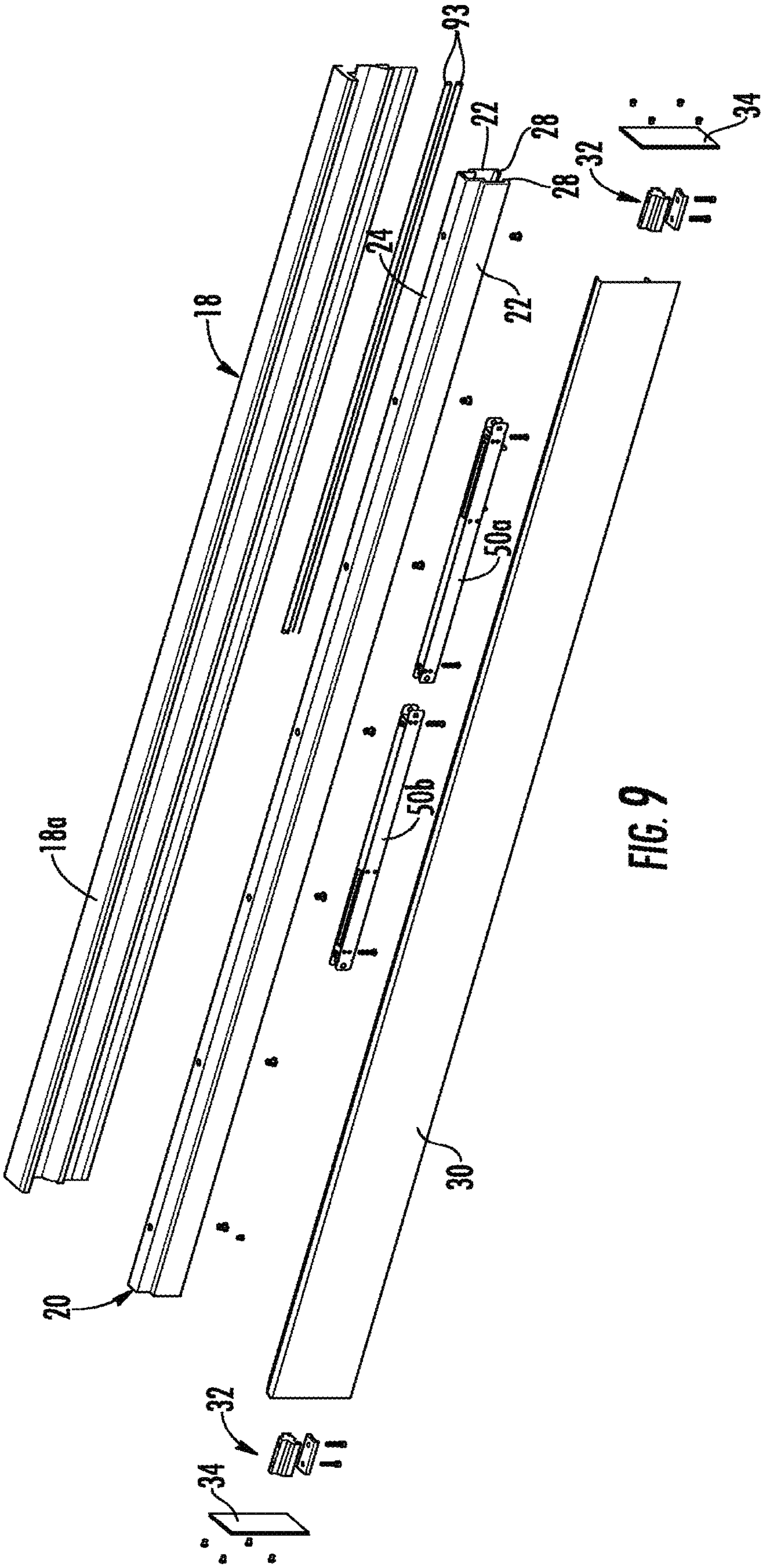
FIG. 9 is a detailed exploded perspective view of the track and associated hardware of the door assembly of FIG. 1.

Referring more specifically to FIG. 6, a pair of soft close devices 50*a*, 50*b* are used in conjunction with the single activator pin 62 such that the single activator pin 62 interacts with both soft close devices 50*a*, 50*b*. Soft close devices are known and a variety of different types of soft close devices may be used to interact with the activator pin 62 to control the opening and closing of the door 2. A typical soft close device includes a housing 52 that retains a carrier or catch 54 that is engaged in a first position by the activator pin 62 as the door 2 reaches the end of travel. The carrier or catch 54 is operatively connected to a damping device such as spring, pneumatic or gas cylinder or the like, or combinations of such elements, that move the carrier/catch and the door 2 via the engagement of the carrier/catch with the activator pin 62, from the first position near the fully closed or near the fully open position to a second position at the fully closed or the fully open positions. As the door moves to the fully closed position the activator pin 62 engages the catch/carrier 54 of the first soft close device 50*a* and when the door 2 moves to the fully open position the activator pin 62 engages the carrier/catch 54 of the second soft close device 50*b*. The soft close device 50*a* moves the door 2 from the first position near the fully closed position (FIGS. 2 and 7) to a second position at the fully closed position (FIGS. 3 and 8). The soft close device 50*b* operates in the same manner for the fully open position. The damping device moves the door 2 in a controlled manner such that the door 2 does not open or close with too much force. The carrier or catch 54 is moved from the second position to the first position by the reverse movement of the door 2 and/or by a separate biasing mechanism. The soft close devices 50*a*, 50*b* are positioned in the track 20 in the upper interior space 21. Set screws 23 engage the soft close devices 50*a* and 50*b* to clamp the soft close devices in position against the track 20.

With a single activator pin 62 approximately centrally positioned on the door 2, the soft close devices 50 are positioned such that the first soft close device 50*a* is engaged by the activator pin 62 as the door nears the fully closed position and the second soft close device 50*b* is engaged by the activator pin 62 as the door 2 nears the fully open position. When the door 2 is at the halfway point of travel between the fully open position and the fully closed position (FIG. 1), the soft close devices 50*a*, 50*b* are spaced approximately equally from the activator pin 62 allowing for the overlap of the door 2 against the door frame 4 when the door 2 is in the closed position. In some embodiments, the activator pin 62 may be located offset from the centerline of the door 2. In such an embodiment, the soft close devices 50*a*, 50*b* may be located in more non-symmetrical positions to maintain the movement of the door 2. For example, referring to FIG. 1 if the activator pin 62 is moved left of the centerline, the soft close devices 50*a*, 50*b* may be moved to the left the same distance. The distance between the activator pin 62 and the soft close devices 50*a*, 50*b* determines the amount of travel the door 2 moves in the opening and closing directions. The actual spacing between the soft close devices 50*a*, 50*b* depends on the width of the door 2, the width of the opening and the desired amount of travel of the door 2.

The use of a single activator pin 62 simplifies the installation of the system, minimizes the number of components and makes alignment of the door 2 easier. It will be appreciated that the use of a single activator pin 62 eliminates the need for a second activator pin. Using a single activator 62 also minimizes door preparation because only a single pin activator mounting structure needs to be installed on the door 2. Moreover, by locating the single activator pin 62 at the center of the door 2, the angle of the door 2 and the heights of the edges of the door 2 may be adjusted without moving the activator pin 62 significantly relative to the first and second soft close devices 50*a*, 50*b* making installation of the door 2 easier. Also, using an activator pin 62 that is mounted to the door 2 separate from the trollies 40, the position of the trollies 40 relative to the door 2 can be adjusted independently of the position of the activator pin 62 relative to the door 2. In some embodiments, a single soft close device may be used adjacent one of the open and closed positions.

Referring to FIGS. 11 through 16 an integrated guide system and bottom door seal will be described. The door seal may include a bottom door seal 118 that seals the bottom edge 12 of the door 2 against the floor or other support structure such that the door 2 is sealed about its entire periphery when the door 2 is in the closed position. Bottom door seals are known where the door seal is moved vertically from a retracted position (FIG. 14A) to an extended position (FIG. 14B) when the door 2 is moved to the closed position such that a sealing member 122 of the bottom door seal 118 engages the floor. One example of such a bottom door seal is disclosed in U.S. Pat. No. 6,125,584 issued to Pemko Manufacturing Co. on Oct. 3, 2000 which is incorporated by reference herein in its entirety. The bottom door seal 118 uses a drive mechanism 120 to move sealing member 122 vertically from the retracted position to the extended position. In one embodiment a plurality of springs 124 are used to move the sealing member 120 vertically between the retracted and extended positions. The springs 124 may be mounted between a plurality of blocks 126 where the ends of each of the springs 124 are mounted to the adjacent blocks and the center of the each of the springs 124 is mounted to the sealing member 122. At least one of the blocks is slidable laterally relative to the housing and at least one of the blocks is mounted in a fixed position relative to the housing. A push rod 130 (FIG. 16) is operatively connected to the slide blocks such that when the push rod 130 is moved to actuate the door seal (such as when the door is closed and the push rod engages the vertical wall of channel member 94), the movement of the push rod 130 is transmitted to the slide blocks via the springs 124 such that the slide blocks are also moved laterally. Because the fixed block is fixed in position, the movement of the slide blocks causes the springs to deform such that the springs force the sealing member 122 vertically downward to seal against a floor or other structure. The sealing member 122 may comprise a deformable gasket 132 that deforms into engagement with the floor to create a tight seal. Although a specific example of a bottom door seal has been shown and described it is to be understood that the integrated guide assembly 200 of the invention may be used with any bottom door seal 118. The gasket 132 may be formed of any suitable compressible, resilient material such as rubber, polymer or the like such that the gasket deforms into engagement with the floor.

The integrated guide assembly 200 comprises a housing 202 that fits into a groove 204 formed in the bottom edge 12 of the door 2. The groove 204 extends along and is open to the bottom edge 12 of the door 2. The groove 204 extends parallel to the direction of travel of the door 2. Housing 202 fits into the groove 204 such that the housing 202 and the groove 204 extend for the width of the door 2 between the leading and trailing edges 14, 16 of the door 2. The housing 202 defines a first channel 208 and a second channel 210. Both of channels 208, 210 extend along the length of the housing 202 and for the width of the door 2 and both channels 208, 210 open toward the bottom edge 12 of the door 2. In one embodiment a common interior wall 212 defines the interior side of both of the channels 208, 210 such that the channels 208, 210 are disposed closely adjacent and parallel to one another to minimize the width of the housing 202. Channel 208 is further defined by outer wall 214 and channel 210 is defined by outer wall 216. Channel 208 is closed by top wall 218 that extends between the interior wall 212 and the outer wall 214 and channel 210 is closed by top wall 220 that extends between the interior wall 212 and the outer wall 216. In the illustrated embodiment the housing 202 includes a pair of opposed flanges 222, 224 that extend from outer walls 214 and 216, respectively and that may be secured to the bottom edge 12 of the door 2. The flanges may be eliminated such that the housing 202 terminates at the end of or inside of the groove 204. The housing 202 may comprise a unitary one-piece member such that the channel 210 for receiving the guide member 232 and the channel 208 for receiving the bottom seal 118 are part of the same member. For example, in some embodiments, the housing 202 may be an extruded member. As used herein the housing 202 may be considered a unitary one-piece member where the housing 202, including both channels 208 and 210, is made of separate components provided the components are connected together outside of the door 2 and are installed in the door 2 as a unit. For example, the housing 202 may be made of planar members secured to one another by welding, crimping, fasteners or the like.

Figure 14A:
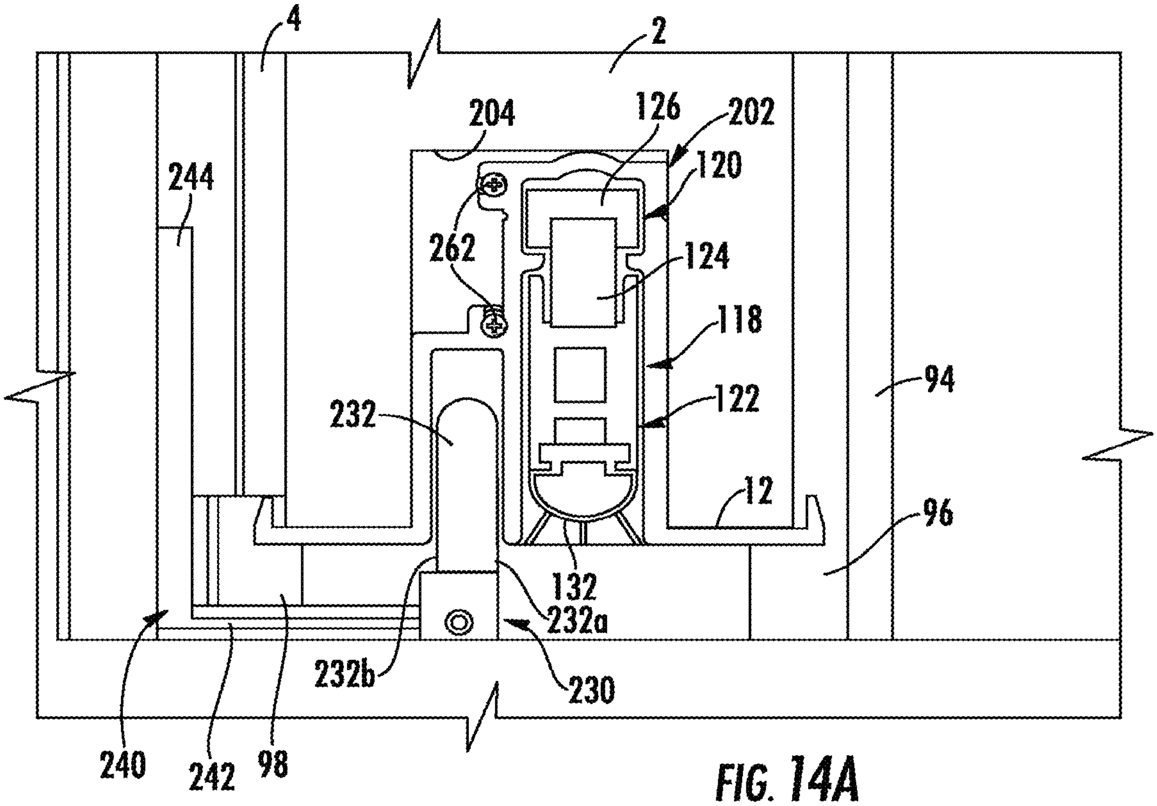
FIG. 14A is an end view of the integrated guide assembly of FIG. 11 with the bottom door seal in a retracted position.
Figure 14B:
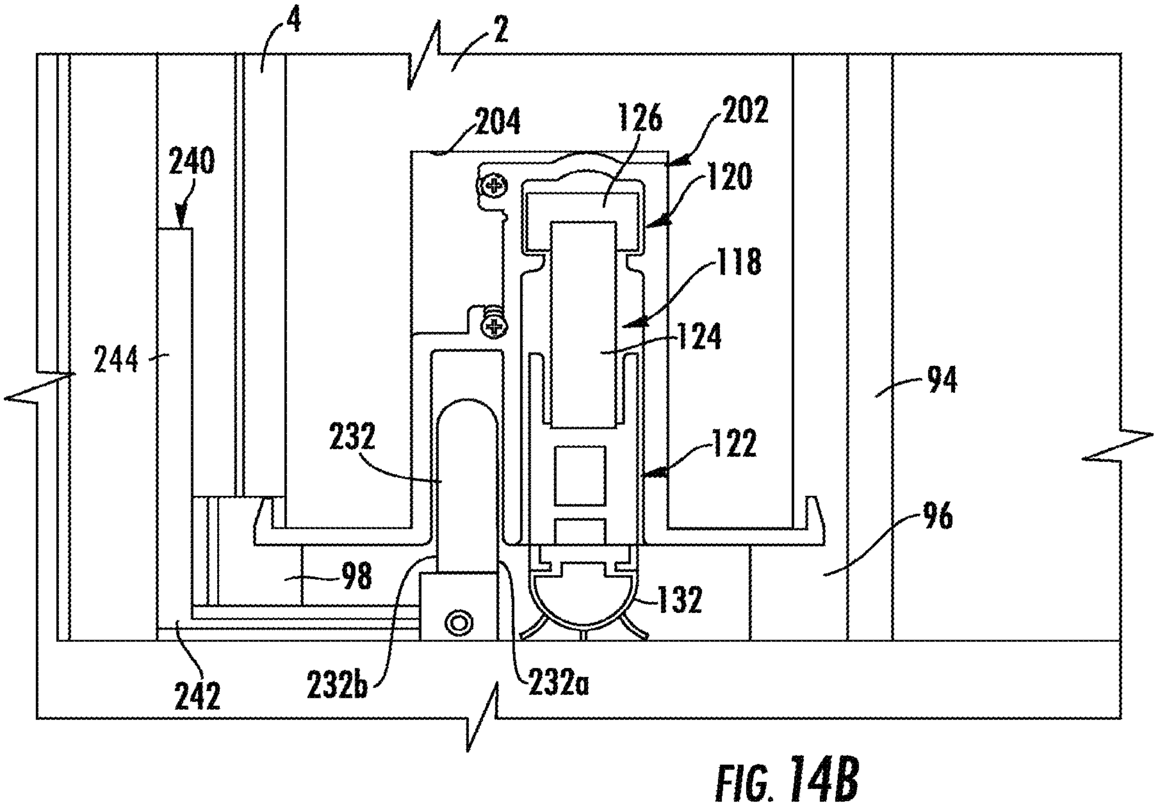
FIG. 14B is an end view of the integrated guide assembly of FIG. 11 with the bottom door seal in an extended position.
Figure 15:
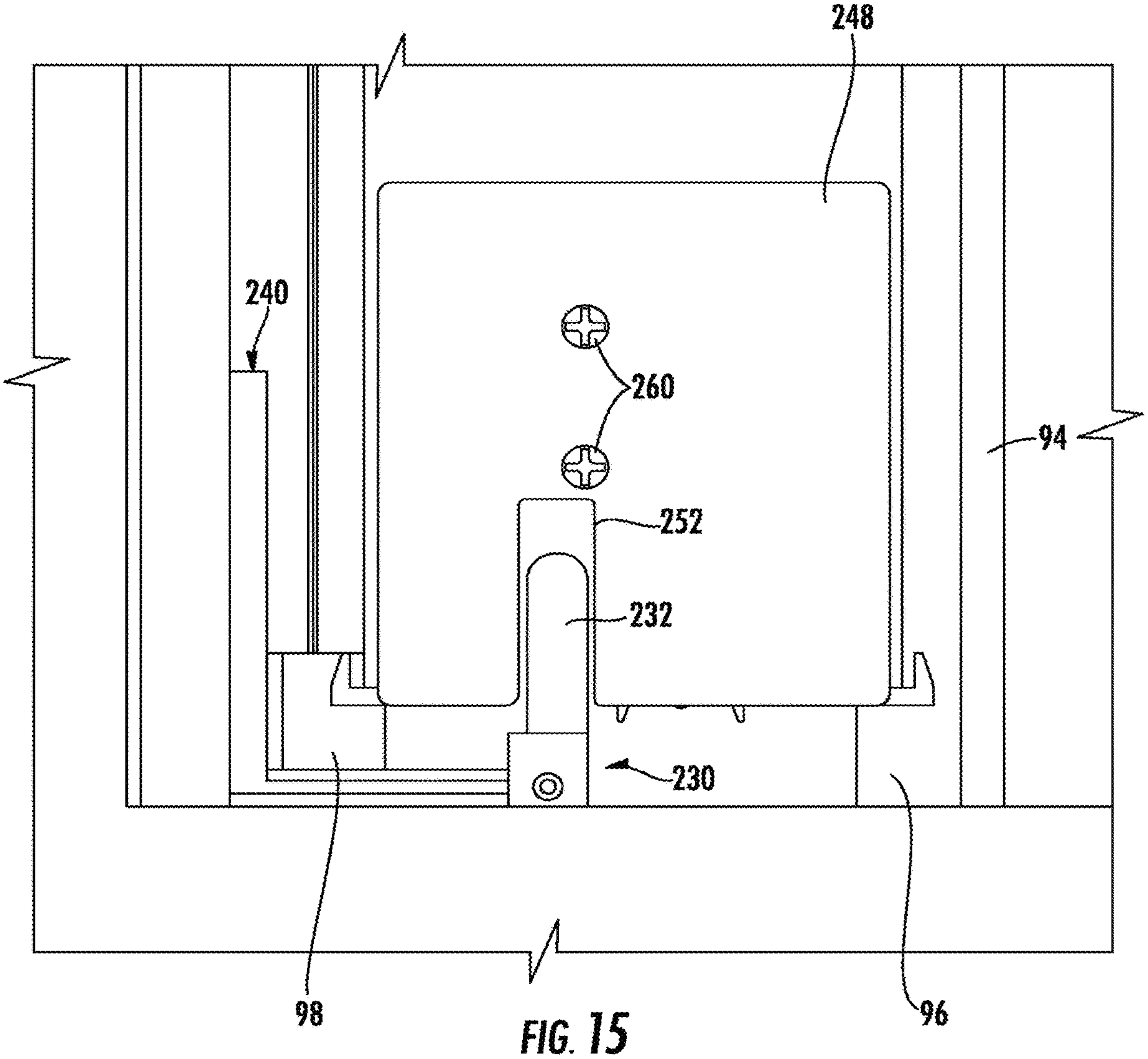
FIG. 15 is an end view of one end of the door showing the integrated guide assembly of FIG. 11 with a cover plate installed.
Figure 16:
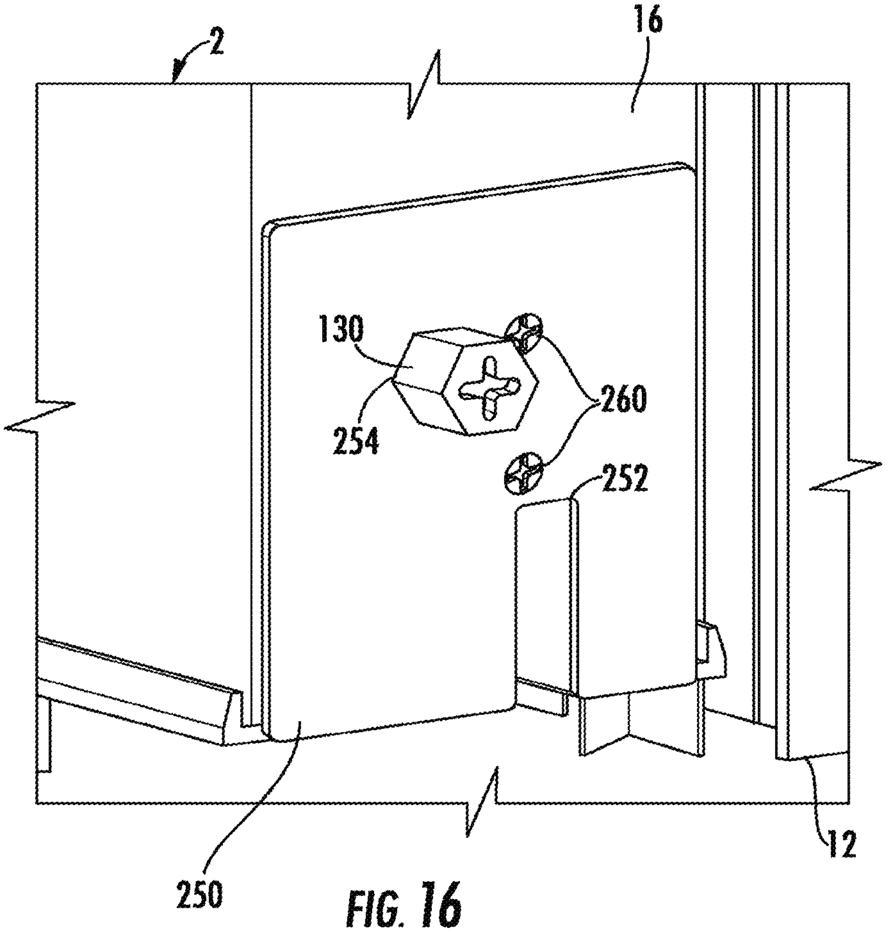
FIG. 16 is a perspective view of the opposite end of the door showing the integrated guide assembly of FIG. 11 with a cover plate installed.
Figure 17:
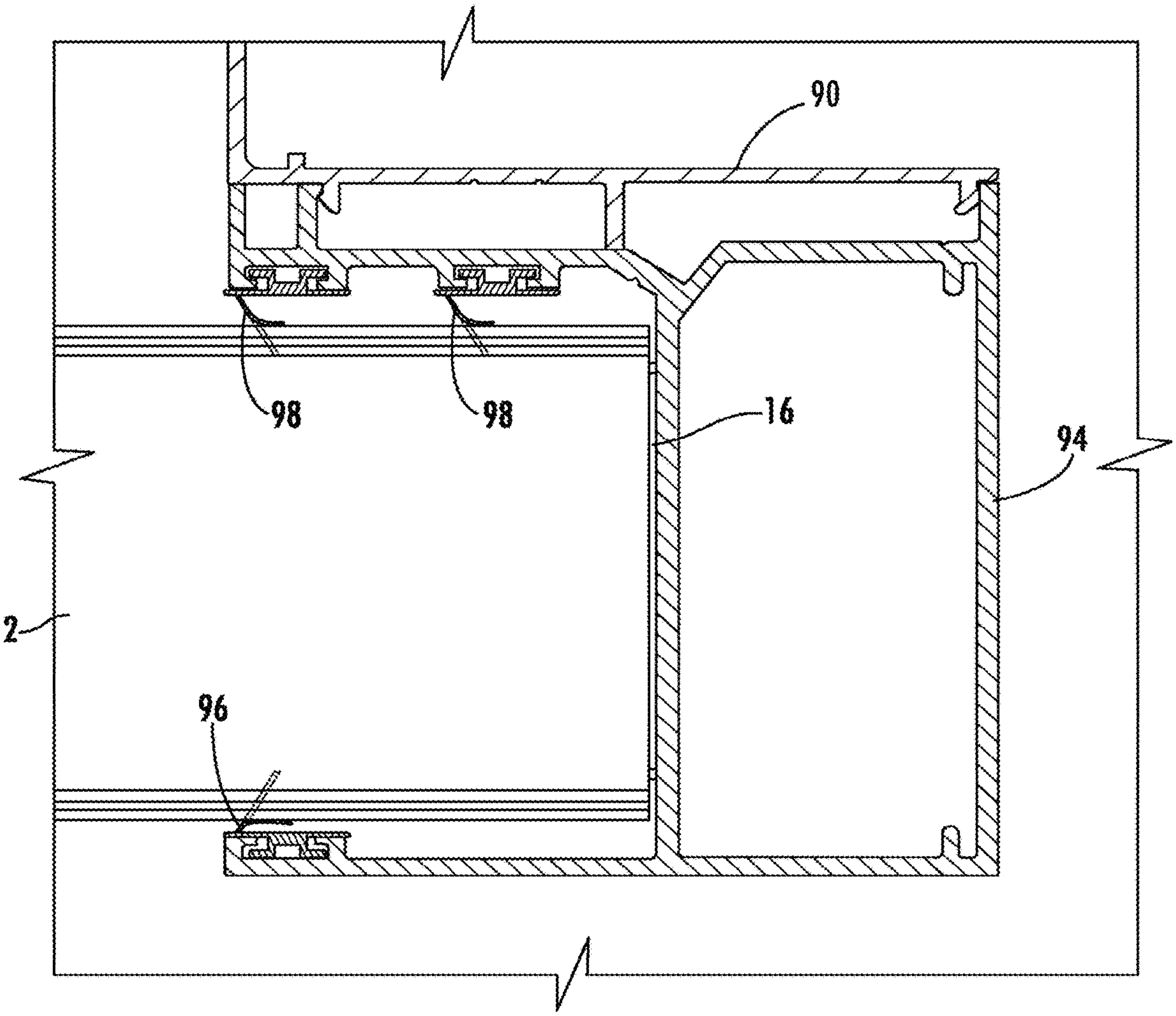
FIG. 17 is a top view of the leading edge of the door in the closed position.

The first channel 208 is dimensioned to receive the bottom seal 118 such that the sealing member 122 may be retracted and extended to seal with the floor or other surface as shown in FIGS. 14A and 14B. The second channel 210 is dimensioned and configured to slidably receive the door guide 230. The door guide 230 comprises an upright guide member 232 that, when engaged with channel 210 maintains the bottom edge 12 of the door 2 in position relative to the wall as the door 2 is opened and closed. In the illustrated embodiment the guide member 232 comprises a flat plate that is closely but slidably received in channel 210. The door guide 230 further comprises a support member 240 that supports the guide member. The support member 240 is arranged such that it does not interfere with the engagement of the sealing member 122 with the floor when the sealing member 122 is extended from the housing.

The support member 240 is positioned such that it extends away from and behind the sealing member 122. In one embodiment the support member 240 comprises an L-shaped member having a horizontal section or leg 242 that may extend along the floor and may be secured thereto and a vertical portion or leg 244 that may be secured to the wall behind the door. It is important for the sealing member 122 to be able to make contact with the floor along its entire length in order to provide a suitable barrier against sound, air, light etc. Therefore, arranging the support 240 such that it does not extend under the sealing member 122 allows the seal to contact the floor in uninterrupted manner. The guide member 232 has a front side 232*a* that faces toward the bottom seal 118 and a back side 232*b* that faces away from the bottom seal 118. In one embodiment, where the channels are disposed closely adjacent to one another the support member 240 does not extend beyond the front side 232*a* such that it does not extend under the sealing member 122.

End plates 248, 250 may be mounted to the side edges of the door 2 to cover the bottom seal. End plate 248 includes a slot 252 to allow the guide member 232 to extend through the end plate 248. Endplate 250 includes an aperture 254 that allows the push rod 130 to extend through end plate 250. In one embodiment screws 260 may extend through apertures in the end plates and engage threaded holes 262 in the housing 202 to secure the end plates 248, 250 in position.

The integrated guide system and bottom door seal of FIGS. 11-16 may be used with the peripheral door seal and soft close system described with respect to FIGS. 1-10. However, the integrated guide system and bottom door seal, the peripheral door seal and the soft close system may be used independently of one another. When used together the integrated guide system and bottom door seal, the peripheral door seal provide a sealing system that resists the transmission of air, light, sound across the door.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A sliding door system comprising:

a door comprising a top edge, a leading edge and a trailing edge defining an inner face, the door being mounted for sliding movement relative to a door opening formed in a structure between a closed position and an open position;

a first gasket and a second gasket deformed into engagement with the inner face adjacent the top edge, the first gasket being spaced from the second gasket to create a gap between the first gasket, the second gasket and the inner face; and an acoustic barrier comprising a front side having a pad and a rear side having a plate positioned at one end of the first gasket and the second gasket, wherein at least a portion of the plate is dimensioned to extend between the first gasket and the second gasket, and wherein the pad of the acoustic barrier engages the inner face of the door and closes the gap between the first gasket, the second gasket and the inner face when the door is in the closed position.

2. The sliding door system of claim 1 wherein the front side of the acoustic barrier is generally planar and deformable.

3. The sliding door system of claim 1 wherein the plate supports the pad.

4. The sliding door system of claim 1 wherein the pad comprises a pile pad.

5. The sliding door system of claim 1 wherein a back side of the acoustic barrier comprise slots that receive flanges of a bracket for aligning with the first gasket and the second gasket.

6. The sliding door system of claim 1 wherein the acoustic barrier is fixed to the structure.

7. The sliding door system of claim 1 further comprising a third gasket mounted to the structure such that it is positioned adjacent the trailing edge of the door when the door is in the closed position and a fourth gasket mounted to the trailing edge of the door.

8. The sliding door system of claim 7 wherein the third gasket comprises a plurality of first deformable sealing members and the fourth gasket comprises a plurality of second deformable sealing members.

9. The sliding door system of claim 8 wherein the plurality of first deformable sealing members interdigitate with the plurality of second deformable sealing members when the door is in the closed position.

10. The sliding door system of claim 8 wherein the plurality of first deformable sealing members alternate with the plurality of second deformable sealing members from the leading edge of the door toward the trailing edge of the door when the door is in the closed position.

11. The sliding door system of claim 8 wherein the third gasket is mounted to the structure such that the plurality of first deformable sealing members extend at a non-perpendicular angle relative to the door.

12. The sliding door system of claim 7 further comprising a channel member that is disposed generally vertically and receives the leading edge of the door when the door is in the closed position, the channel member comprising a fifth gasket that faces the door such that when the door is in the closed position and the leading edge of the door is received in the channel member such that the fifth gasket engages the door near the leading edge.

13. A sliding door system comprising:

a door comprising a top edge, a leading edge and a trailing edge defining an inner face, the door being mounted for sliding movement relative to a door opening formed in a structure between a closed position and an open position;

a first gasket and a second gasket deformed into engagement with the inner face adjacent the top edge, the first gasket being spaced from the second gasket to create a gap between the first gasket, the second gasket and the inner face; and an acoustic barrier positioned at one end of the first gasket and the second gasket, wherein a back side of the acoustic barrier comprises slots that receive flanges of a bracket for aligning with the first gasket and the second gasket, and wherein the acoustic barrier engages the inner face and closes the gap between the first gasket, the second gasket and the inner face when the door is in the closed position.

* * * * *